July 23, 1963
F. Z. FOUSE ETAL
3,098,564
AUTOMATIC CONTAINER INSPECTION MACHINE
Filed Aug. 18, 1961
18 Sheets-Sheet 8
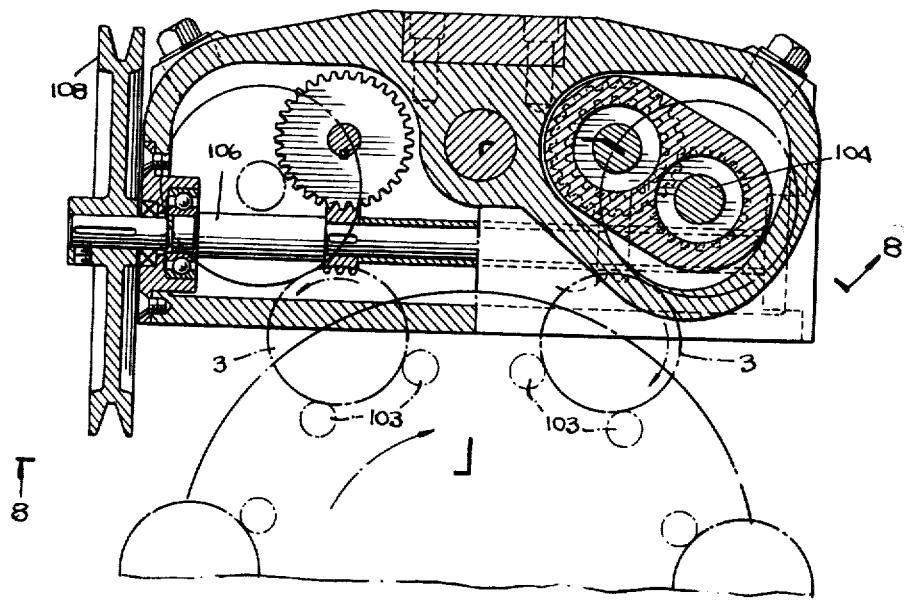
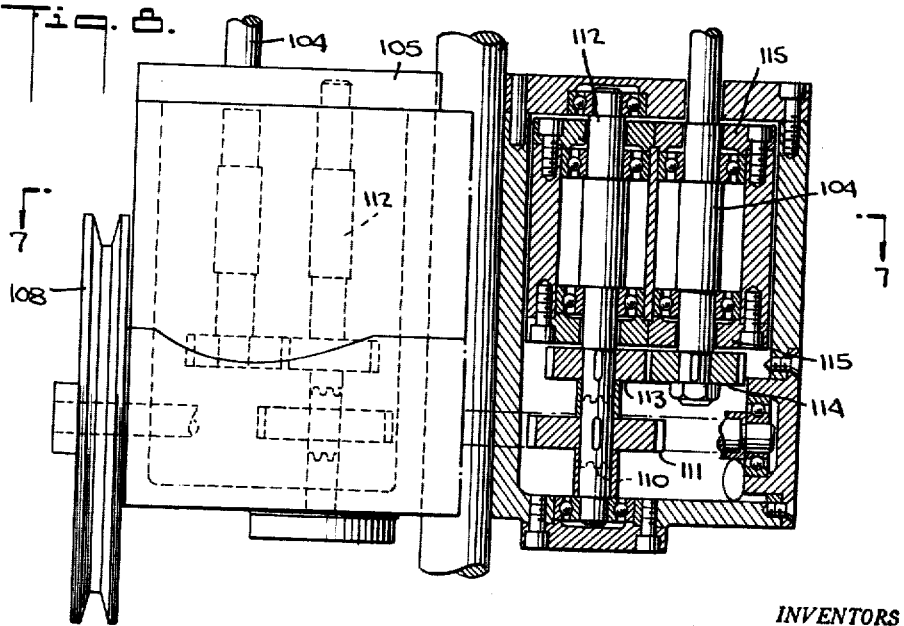
INVENTORS
FREDERICK Z. FOUSE
JAY F. KIDWELL
BY
ATTORNEY

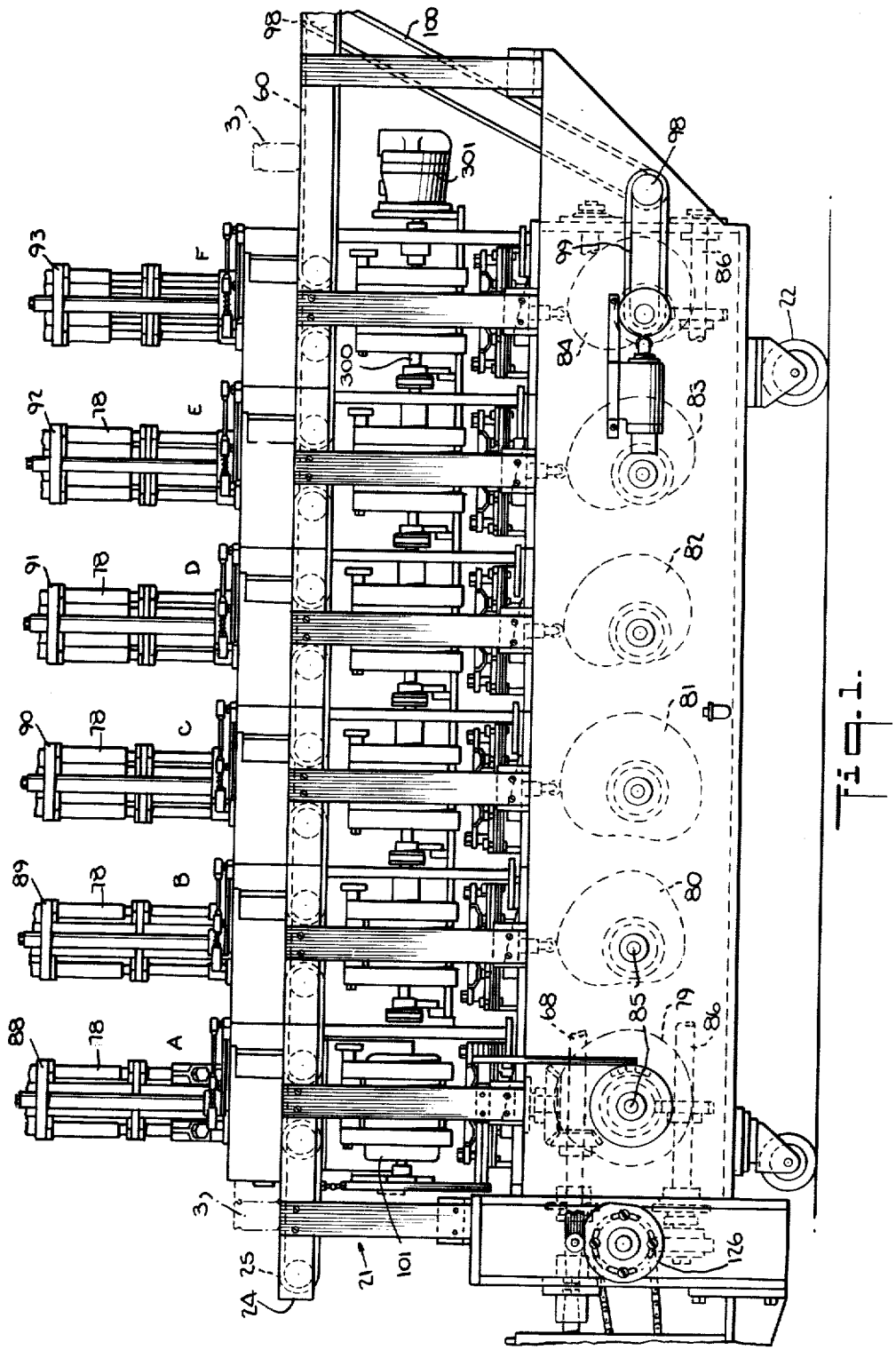

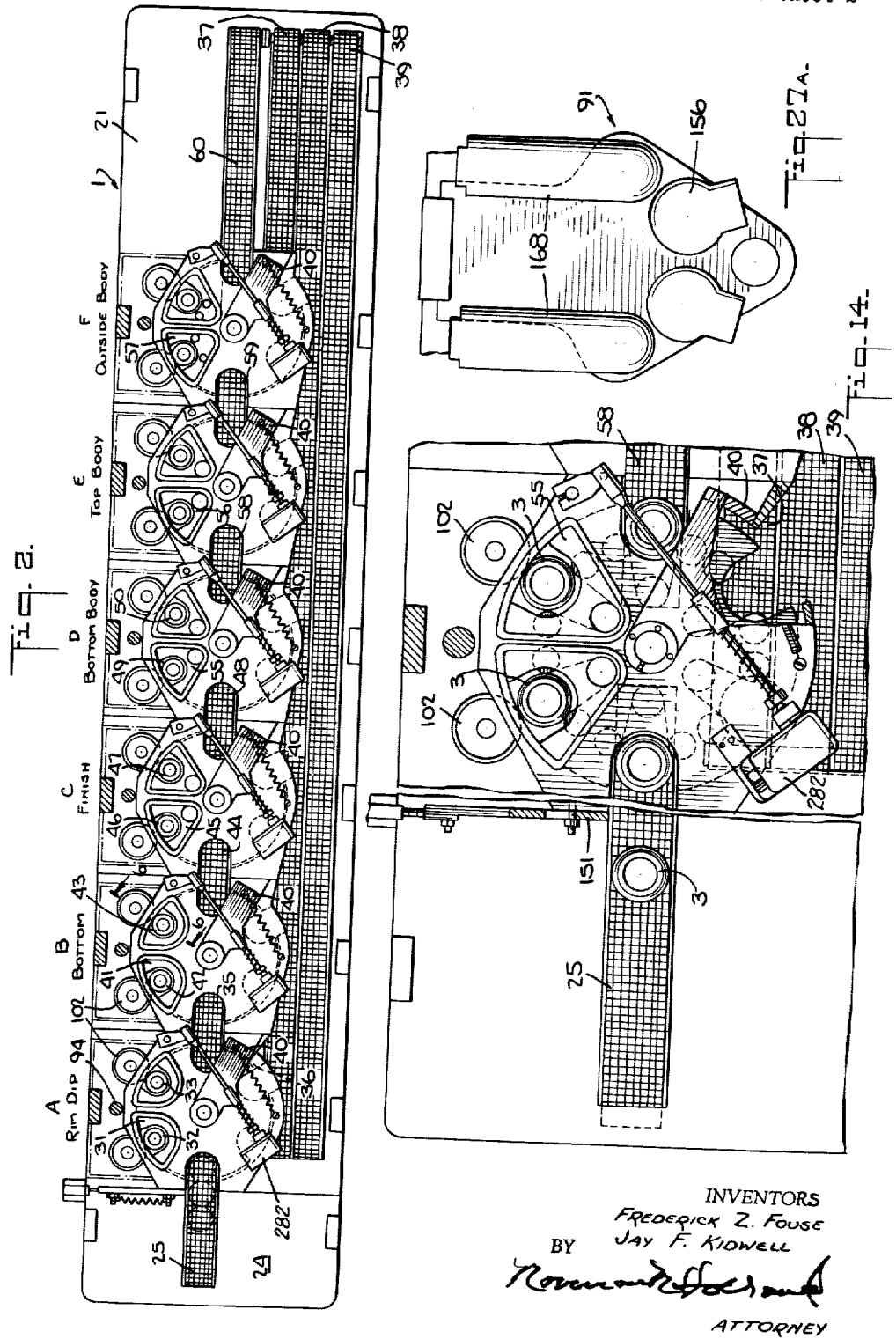

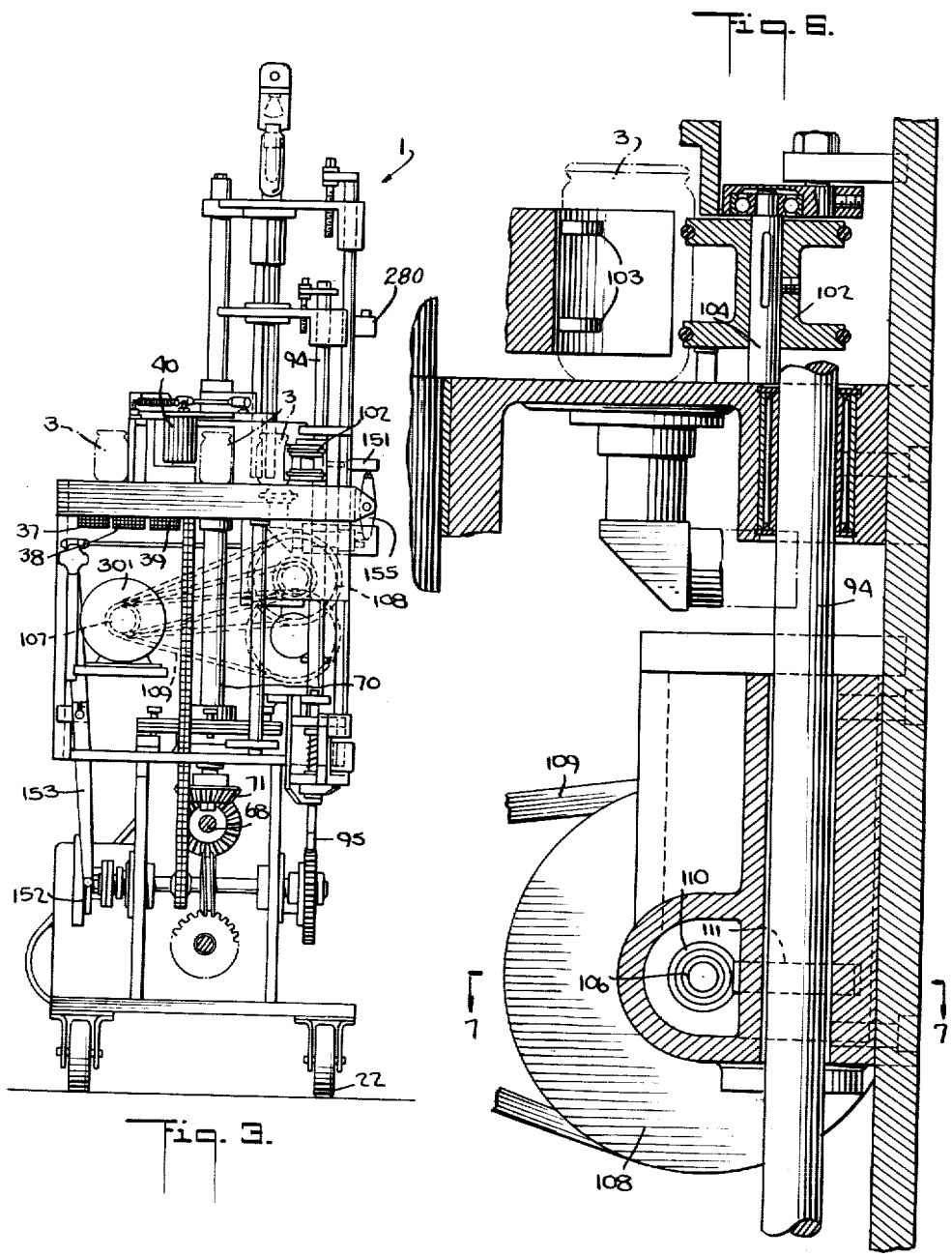

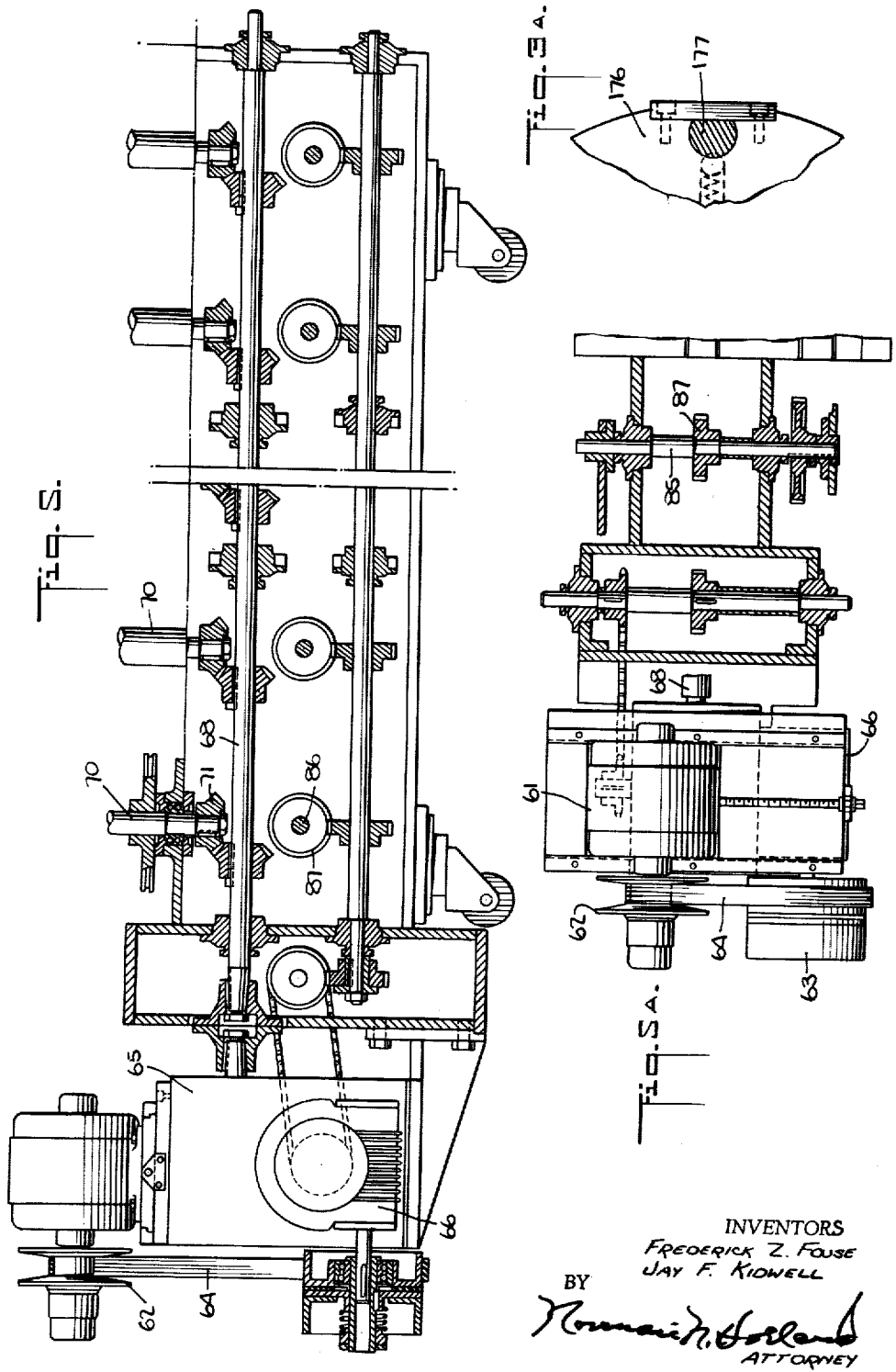

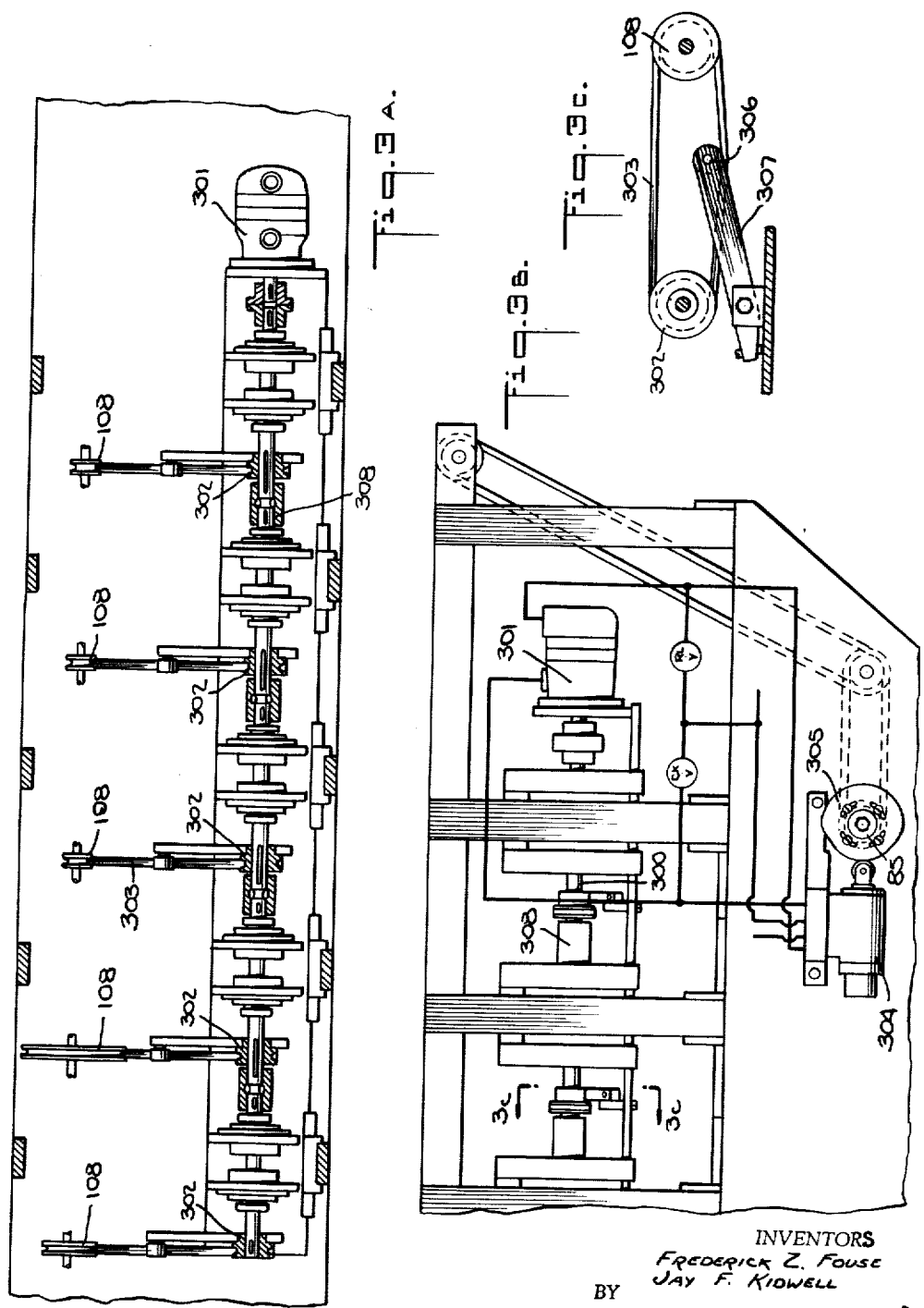

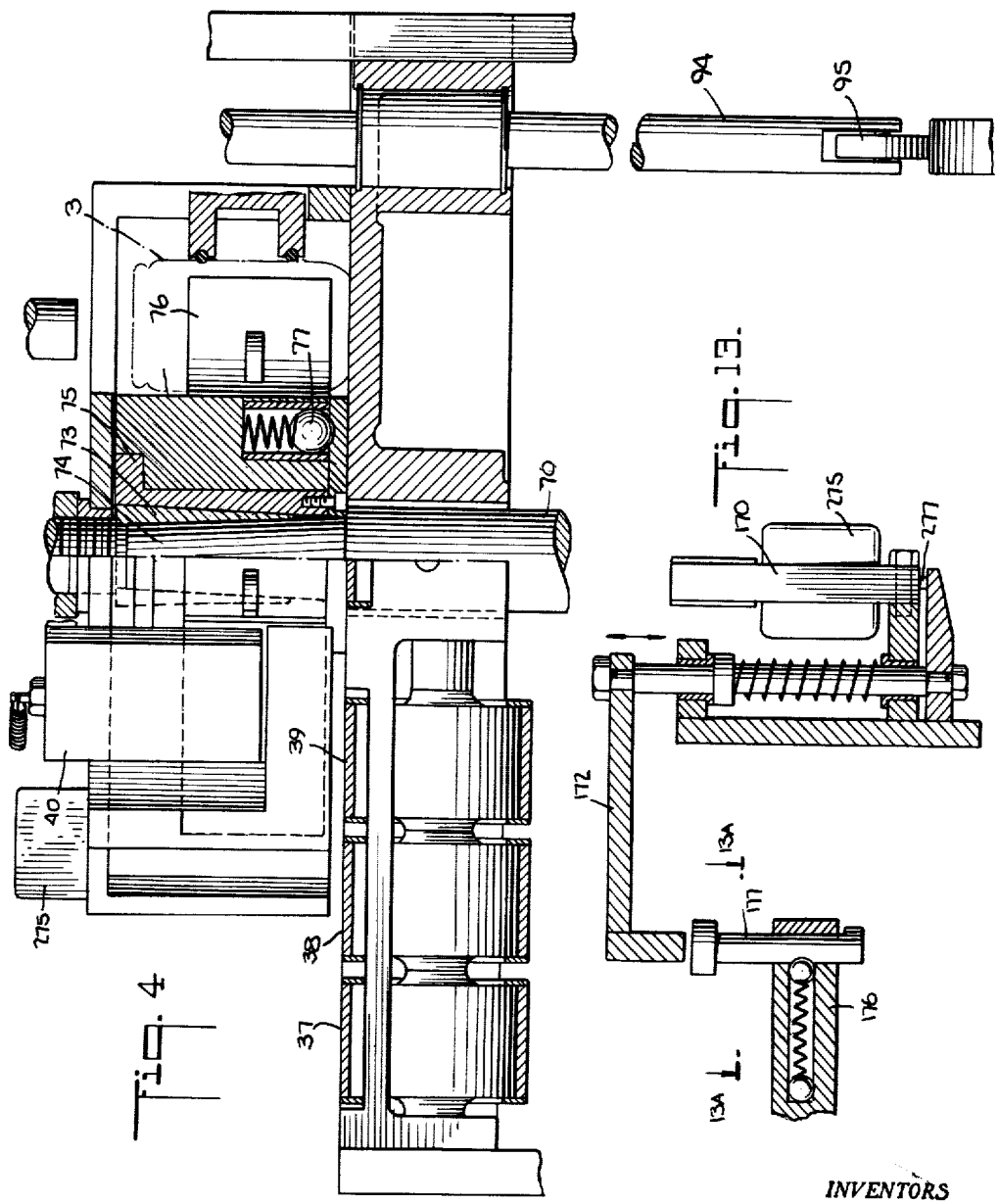

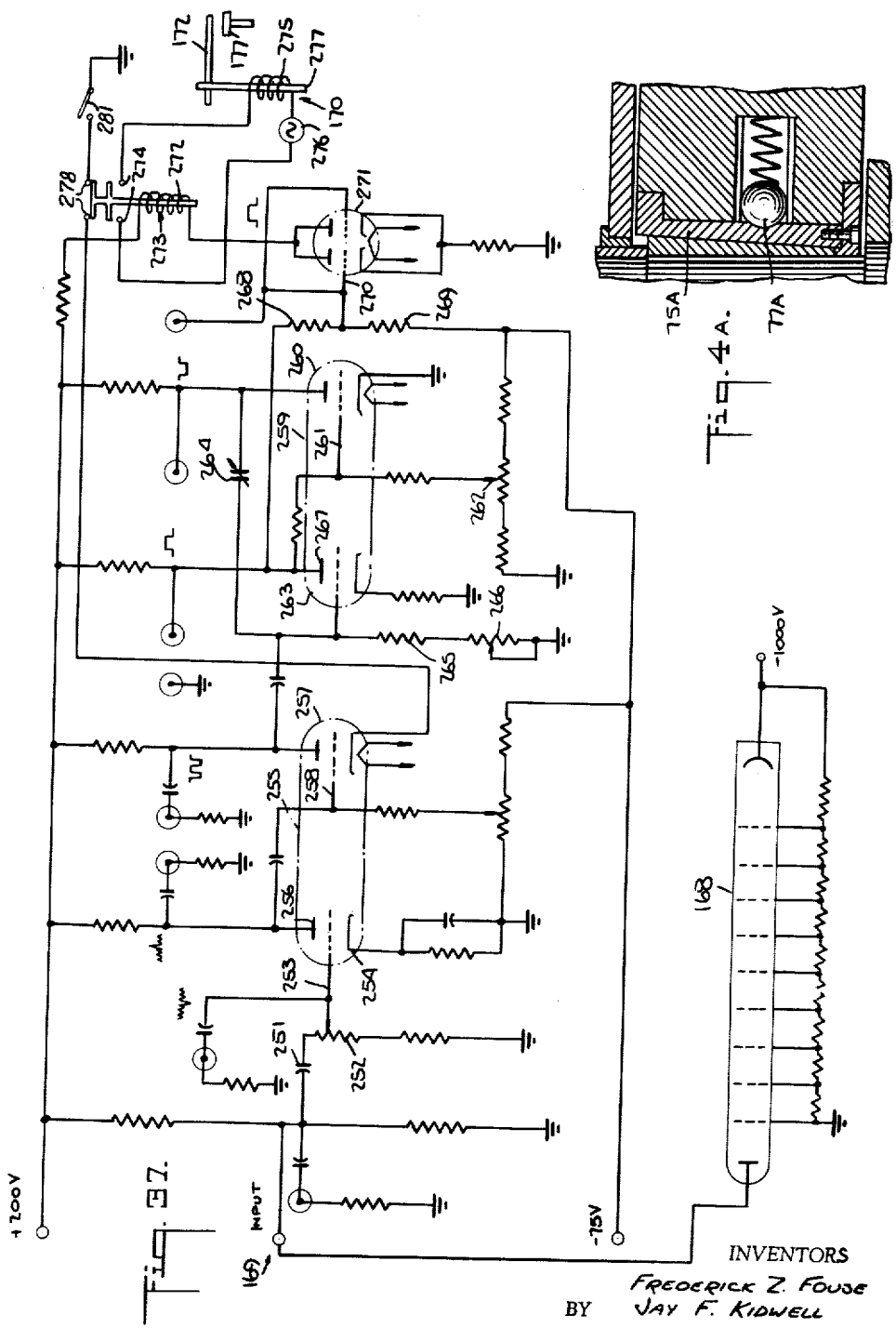

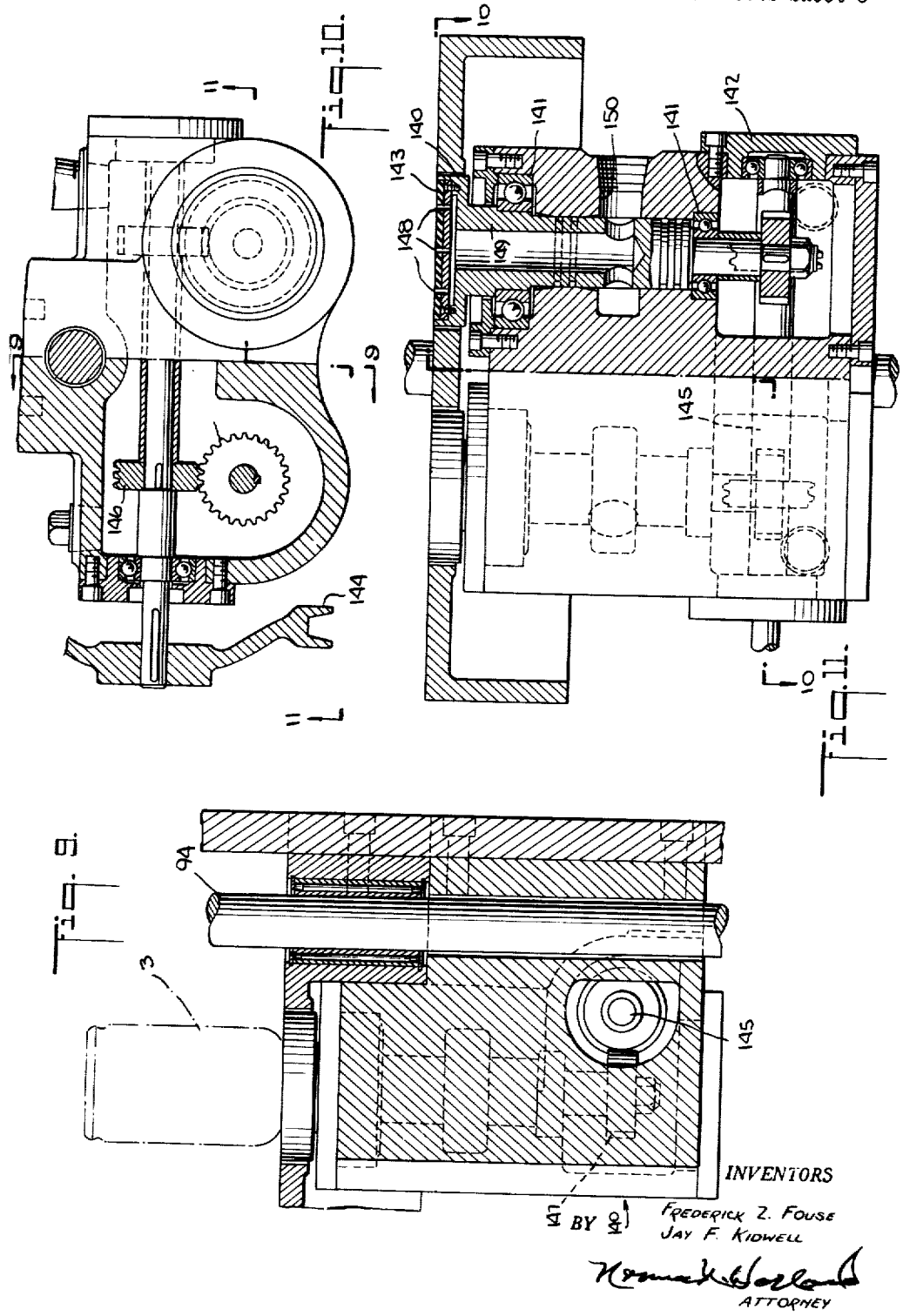

July 23, 1963 F. Z. FOUSE ETAL 3,098,564
AUTOMATIC CONTAINER INSPECTION MACHINE
Filed Aug. 18, 1961 18 Sheets-Sheet 10

INVENTORS
FREDERICK Z. FOUSE
JAY F. KIDWELL
BY
[signature]
ATTORNEY

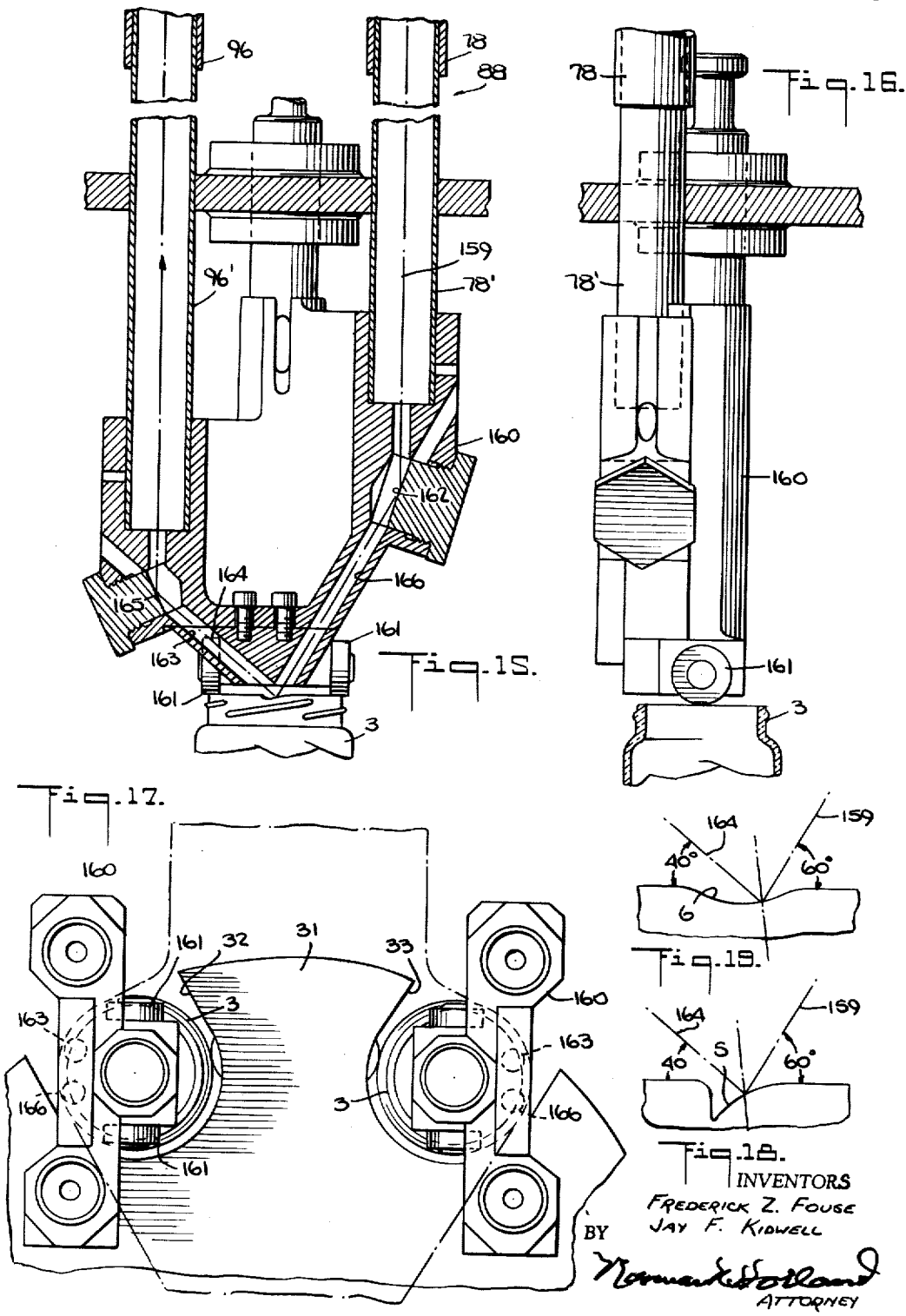

INVENTORS
FREDERICK Z. FOUSE
JAY F. KIDWELL
BY
ATTORNEY

July 23, 1963 F. Z. FOUSE ETAL 3,098,564
AUTOMATIC CONTAINER INSPECTION MACHINE
Filed Aug. 18, 1961 18 Sheets-Sheet 13
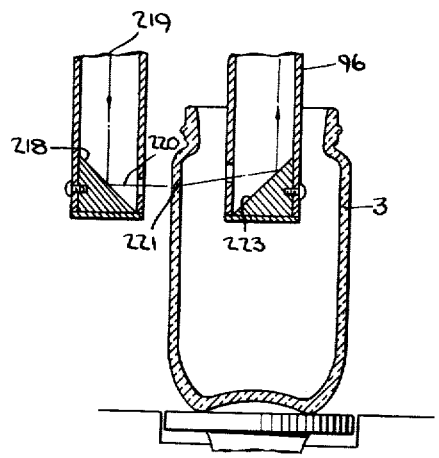
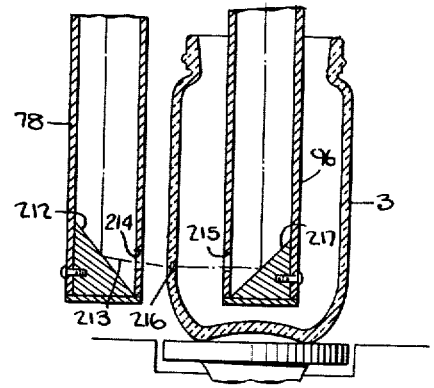
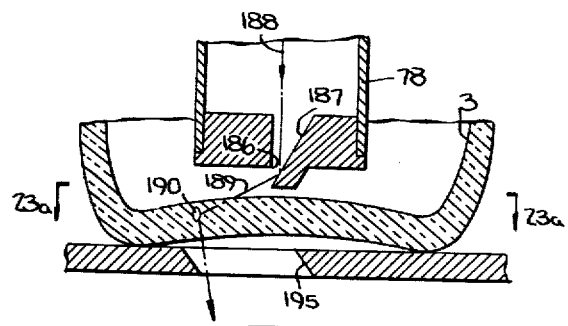
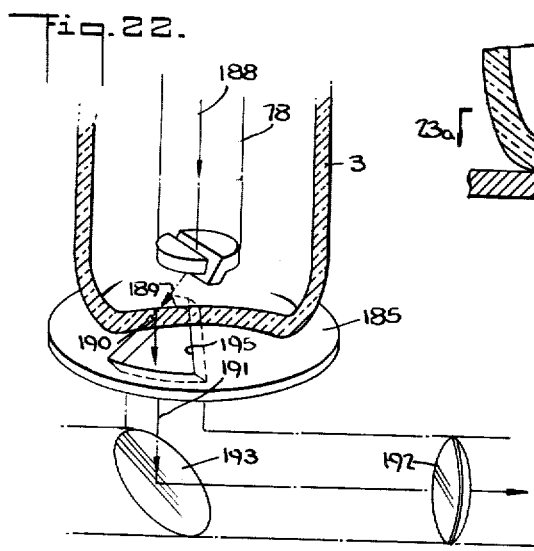
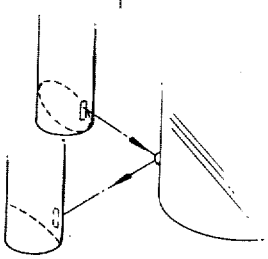
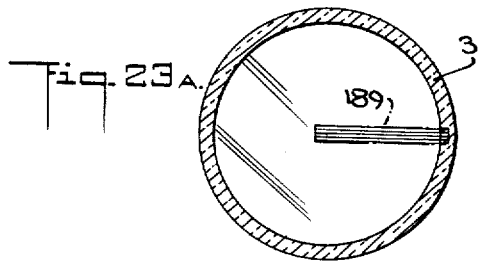
INVENTORS
FREDERICK Z. FOUSE
JAY F. KIDWELL
BY
*Norman Worland*
ATTORNEY

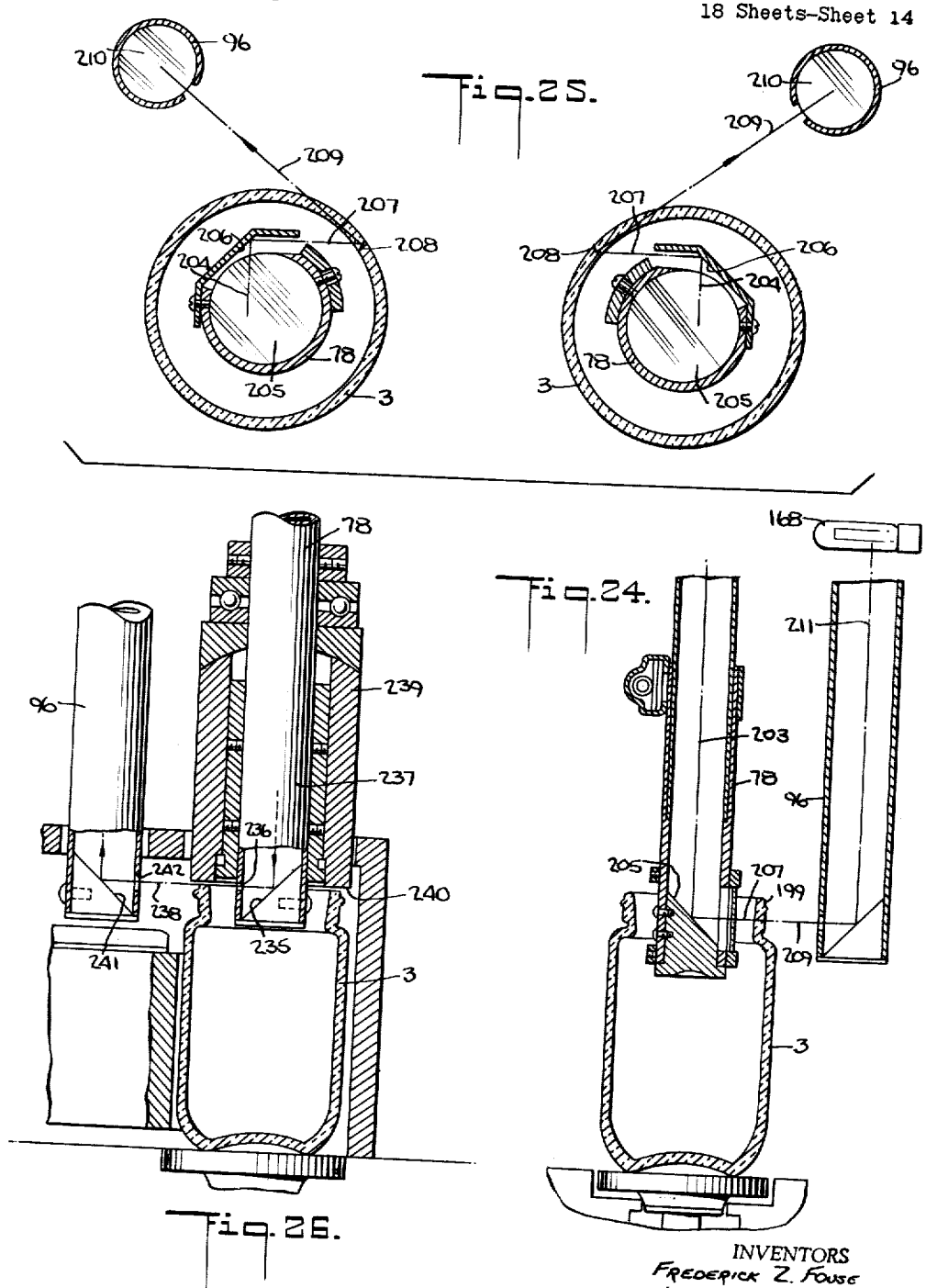

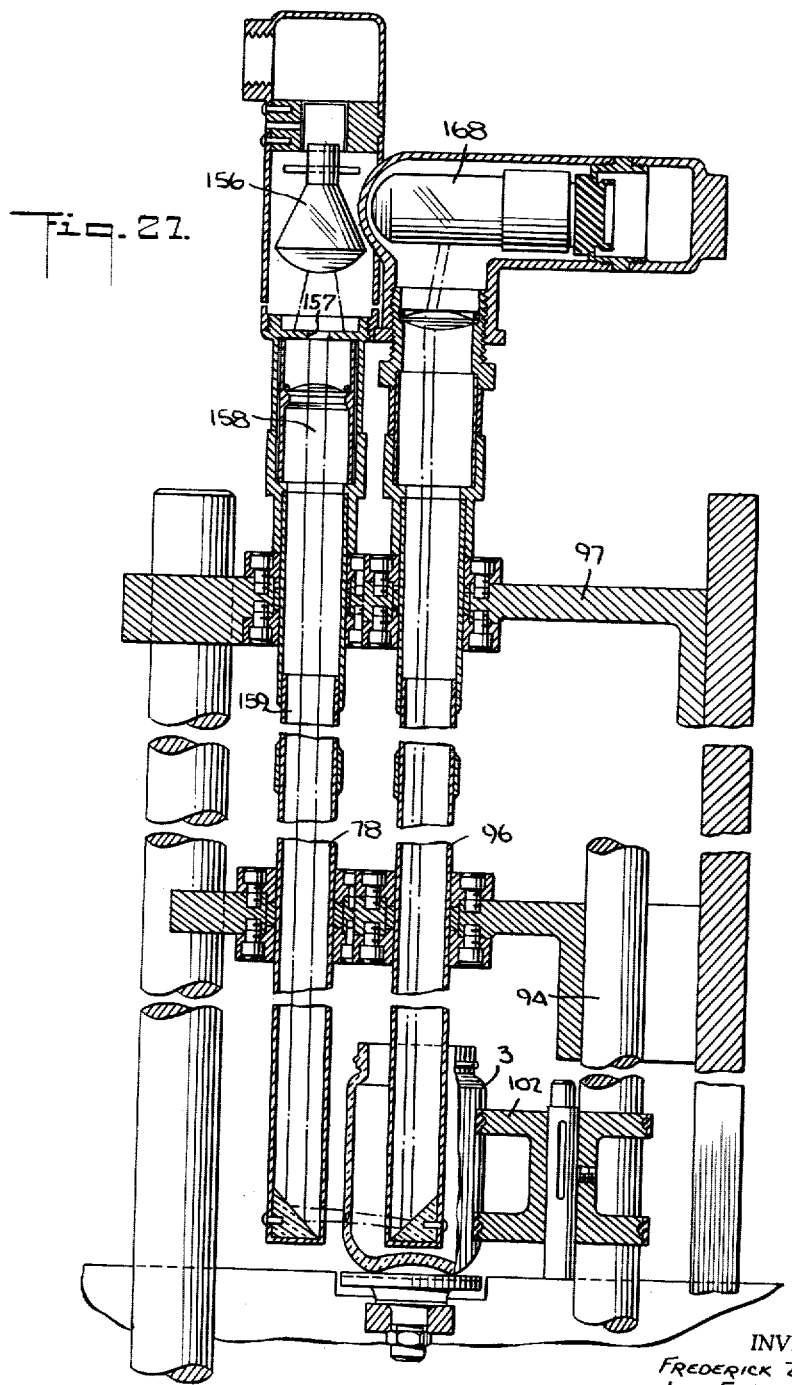

July 23, 1963

F. Z. FOUSE ETAL 3,098,564

AUTOMATIC CONTAINER INSPECTION MACHINE

Filed Aug. 18, 1961

INVENTORS
FREDERICK Z. FOUSE
JAY F. KIDWELL
BY
ATTORNEY

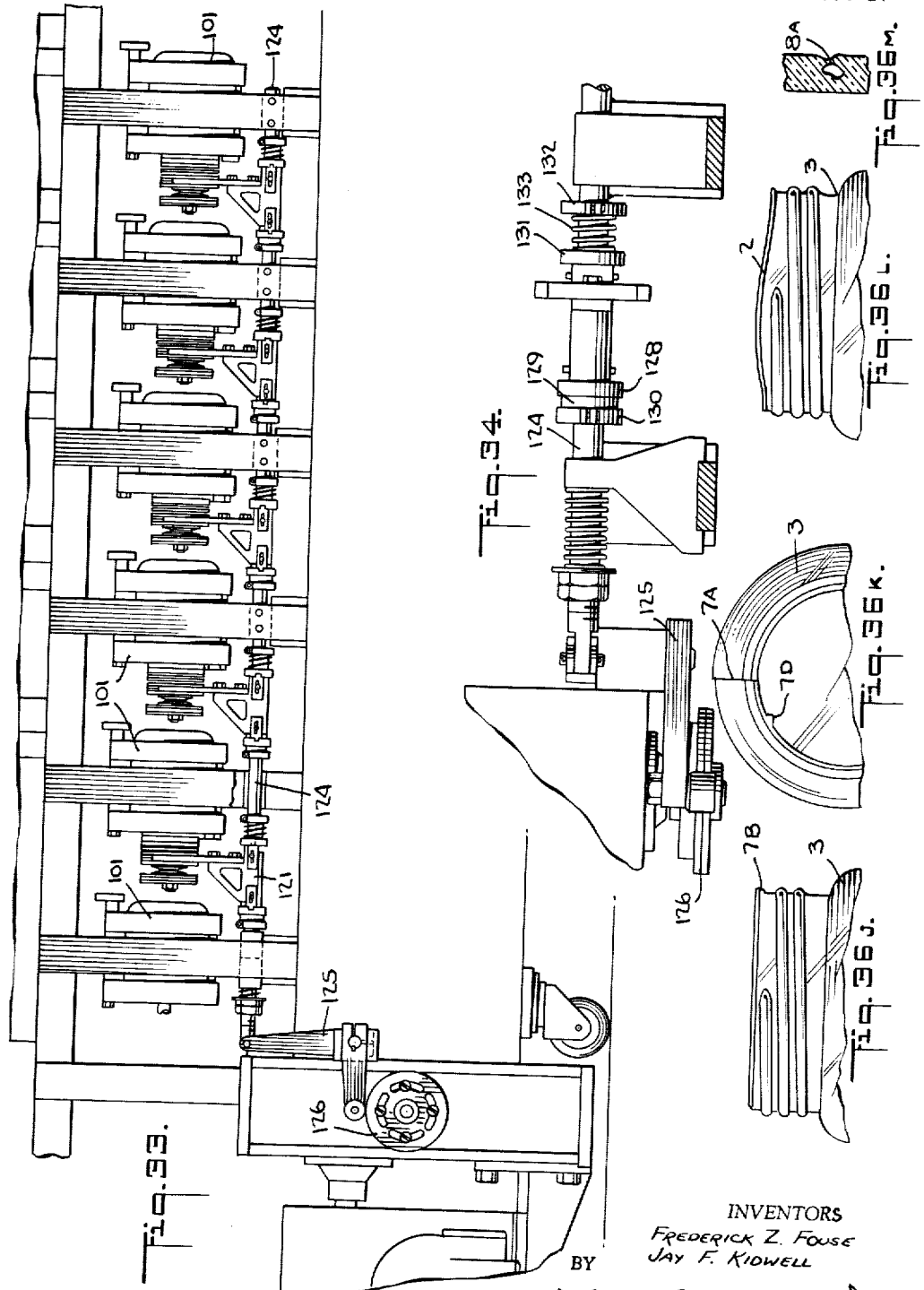

July 23, 1963
F. Z. FOUSE ETAL
3,098,564
AUTOMATIC CONTAINER INSPECTION MACHINE
Filed Aug. 18, 1961
18 Sheets-Sheet 18
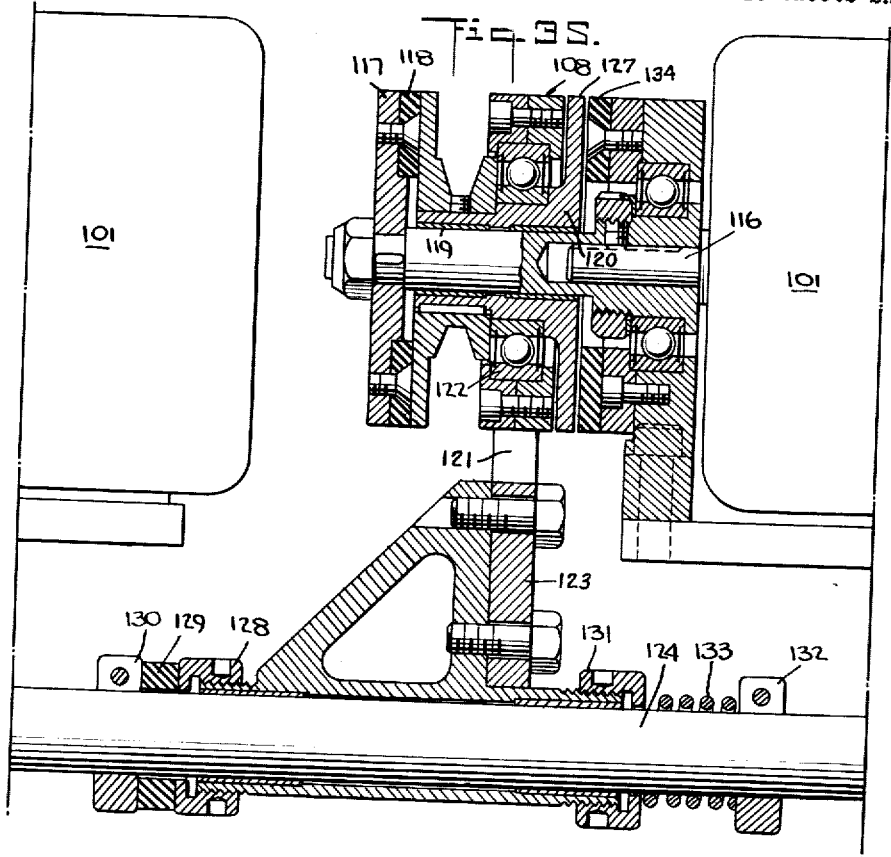
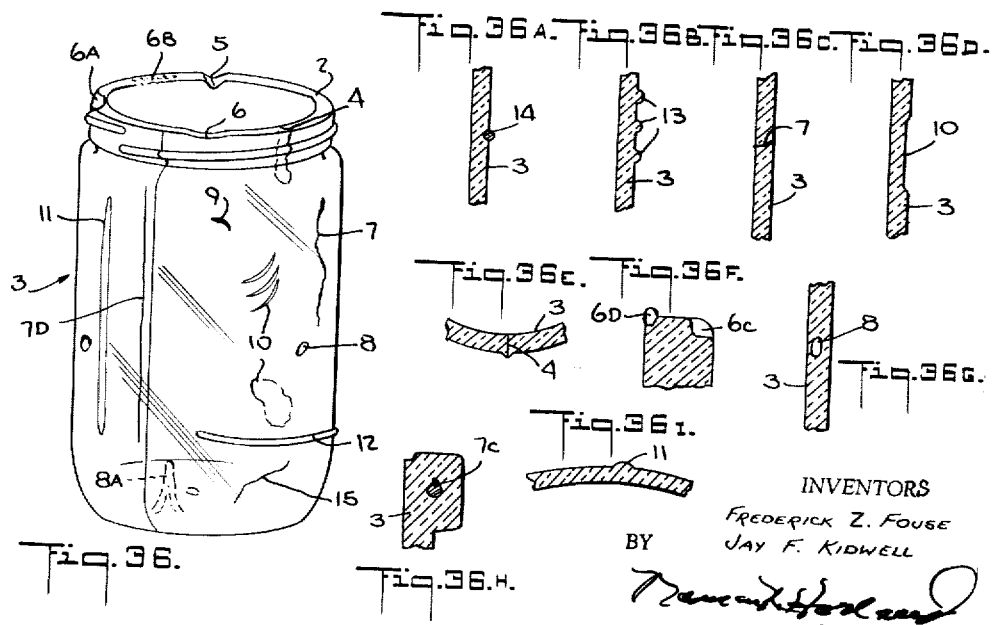
INVENTORS
FREDERICK Z. FOUSE
JAY F. KIDWELL
BY
ATTORNEY

3,098,564
AUTOMATIC CONTAINER INSPECTION MACHINE

Frederick Z. Fouse and Jay F. Kidwell, Lancaster, Ohio, assignors to Anchor Hocking Glass Corporation, Lancaster, Ohio, a corporation of Delaware
Filed Aug. 18, 1961, Ser. No. 132,509
18 Claims. (Cl. 209—75)

The present invention relates to an improved automatic inspection machine for selectively detecting a variety of defects in transparent containers and for automatically removing such defective containers from a moving line.

This application is a continuation-in-part of our co-pending application S.N. 54,616 filed on September 8, 1960.

Glass containers such as are used for packaging and particularly for food packaging are presently manufactured at high speeds on automatic container forming machinery. These automatic machines have a continuous high speed output of the glass containers. These containers must be inspected, assembled, packaged and transported to the package user.

An essential step in the handling of the containers after their formation and before their use by the packers is an inspection of each individual container to see that it contains no flaws which would interfere with an efficient air-tight sealing of the container, which weaken the container to reduce its resistance to damage during transportation, storage or display, or which impair its appearance.

As will be more fully discussed below, there are a wide variety of different types of flaws which are found in completed containers which inevitably occur in even the most carefully controlled container forming operations. Some of these flaws are serious enough so that the container having the flaw should not be used in packaging since it will result in a dangerously weak package or in a poor seal. Other flaws while less serious from a sealing or strength point of view are undesirable from an appearance standpoint and these should also preferably be removed from the container supply. Containers with flaws of a minor nature should not be rejected.

It has been present practice to have each glass container inspected by a jar inspector who scans each container or jar to see if there are any visible defects. This inspection of each jar in some plants is supplemented by a mechanical inspection of each jar for certain more obvious flaws such as checks in the jar rims. Thus, at present each jar is either totally inspected by jar inspection personnel or is inspected in an awkward and time consuming inspection where one flaw is detected by an inspection machine and other flaws are checked for by jar inspection personnel. Inspection of the jars by inspection personnel is not satisfactory for several reasons even where such personnel may be highly skilled and experienced. One reason is that visual inspection for even fairly obvious flaws soon results in fatigue and an inevitable lowering of inspection standards during the course of even a relatively short inspection period. In addition, packers have found that certain flaws even though relatively minute and undetectable by even experienced jar inspection personnel are objectionable in the finished jars. Such flaws are particularly objectionable in the jar sealing surface where the hermetic seal is formed between the jar closure and the jar sealing surface, however, they are also objectionable in other surfaces such as the jar sidewalls and bottom.

The jar inspection machine of the present invention improves the jar inspecting operation by automatically and selectively detecting all known types of flaws which might interfere either with jar sealing or with jar strength and it is particularly efficient in detecting minute flaws which are objectionable and which are undetectable or which are detected only with great difficulty by jar inspection personnel. In addition, the improved inspection machine of the present invention combines a series of inspections in a single compact inspecting line wherein the jars are fed continuously in one end and pass continuously out the other end of the inspection machine. Between the two ends of the machine are a series of interrelated and cooperating inspection stations.

Accordingly, an object of the present invention is to provide an improved automatic inspection machine for transparent containers.

Another object of the present invention is to provide a compact and high speed automatic container inspection machine adapted to inspect all surfaces of a transparent container.

Another object of the present invention is to provide an automatic container inspection machine adapted to eject containers immediately upon the detection of a flaw.

Another object of the present invention is to provide an improved high speed automatic container inspection machine adapted to discriminate between containers having objectionable and unobjectionable flaws so that the latter containers are not rejected.

Another object of the present invention is to provide a compact, high speed and reliable container inspection machine adapted to be positioned alone or with one or more individual inspection machines in a container inspection line.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of the inspection machine according to the present invention;

FIG. 2 is a top plan view of the inspection machine of FIG. 1;

FIG. 3 is an end elevational view of the inspection machine of FIG. 1;

FIG. 3A is a detailed plan view of the jar rotation drive system;

FIG. 3B is a fragmentary side elevational view of the drive system of FIG. 3A;

FIG. 3C is a sectional view taken along line 3C—3C of FIG. 3B;

FIG. 4 is a vertical sectional view of a container inspection station;

FIG. 4A is a fragmentary detailed view of another embodiment of the container inspection station;

FIG. 5 is a fragmentary side elevational view partially in section of the machine drive system;

FIG. 5A is a horizontal sectional view taken along line 5A—5A of FIG. 5;

FIG. 6 is a sectional view of the bottom inspection station;

FIG. 7 is a sectional view of the container rotating drive taken along line 7—7 of FIG. 8;

FIG. 8 is a sectional view of the container rotating drive taken along line 8—8 of FIG. 7;

FIG. 9 is an enlargement detailed sectional view of another embodiment of a container rotating drive taken along line 9—9 of FIG. 10;

FIG. 10 is a sectional view of the container rotating drive of FIG. 9 taken along line 10—10 of FIG. 11;

FIG. 11 is a side elevational view partially in section of the container rotating drive of FIG. 9 taken along line 11—11 of FIG. 10;

FIG. 13 is an enlarged detailed view of the container rejection solenoid and a cooperating reject pin;

FIG. 13A is a sectional view taken along line 13A—13A of FIG. 13;

FIG. 14 is a fragmentary top plan view of the container entry end of the machine and of a container body inspection station;

FIG. 15 is a sectional view of the container inspection head at the nit inspection station;

FIG. 16 is an end elevational view of the container inspection head of FIG. 15;

FIG. 17 is a plan view of the nit inspection head of FIG. 15;

FIGS. 18 and 19 are greatly exaggerated views of a container rim illustrating a typical nit and vertical mark respectively in the finish of the container rim;

FIG. 22 is a perspective view of the bottom inspection station illustrating the passage of a light beam;

FIG. 23 is an enlarged detailed sectional view of the bottom of a container at the bottom inspection station;

FIG. 23A is a sectional view of a jar in the bottom inspection station taken along line 23A—23A of FIG. 23;

FIG. 24 is a detailed sectional view showing the container finish inspection station;

FIG. 25 is a horizontal sectional view of the finish inspection station illustrating the paths of the light beams through the two adjacent inspection positions;

FIG. 26 is a vertical sectional view of a container rim dip inspection station;

FIG. 27 is a vertical sectional view of one of the container body inspection stations showing the vertical light beam transmitting tubes for the light source and the photoelectric cell;

FIG. 27A is a detailed top plan view of the optical system of an inspection station;

FIG. 28 is a vertical sectional view showing the optical system for one position of the container body inspection station;

FIG. 29 is a vertical sectional view showing another embodiment of the optical system at the container body inspection station;

FIG. 32 is a perspective view illustrating the optical system of the inspection station of FIG. 30;

FIG. 33 is a side elevational view of the inspection machine illustrating another embodiment of the automatic braking system for the container rotating drive;

FIG. 34 is a fragmentary sectional view illustrating the details of a braking station for the braking system of FIG. 33;

FIG. 35 is an enlarged detailed sectional view of a braking head of the braking system of FIG. 33;

FIG. 36 is a perspective view of a container illustrating typical defects detected by the machine of the present invention;

FIGS. 36A–36M are enlarged detailed views of jar defects;

FIG. 37 is a schematic diagram of a preferred embodiment of a container rejection signal amplifier.

Types of Container Flaws Detected

Figure 12:
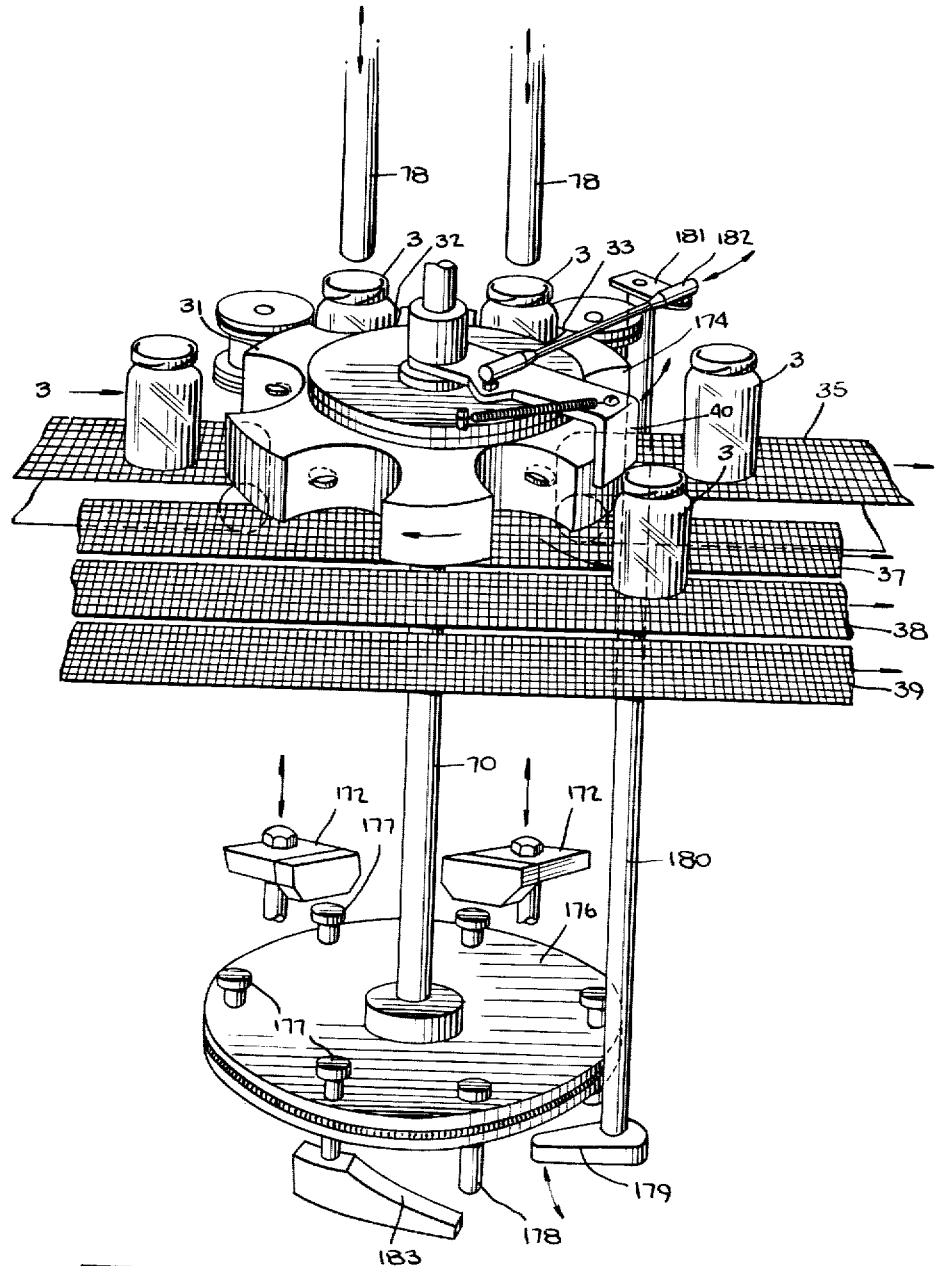
FIG. 12 is a perspective view of the container rejection gate control system.
Figure 20:
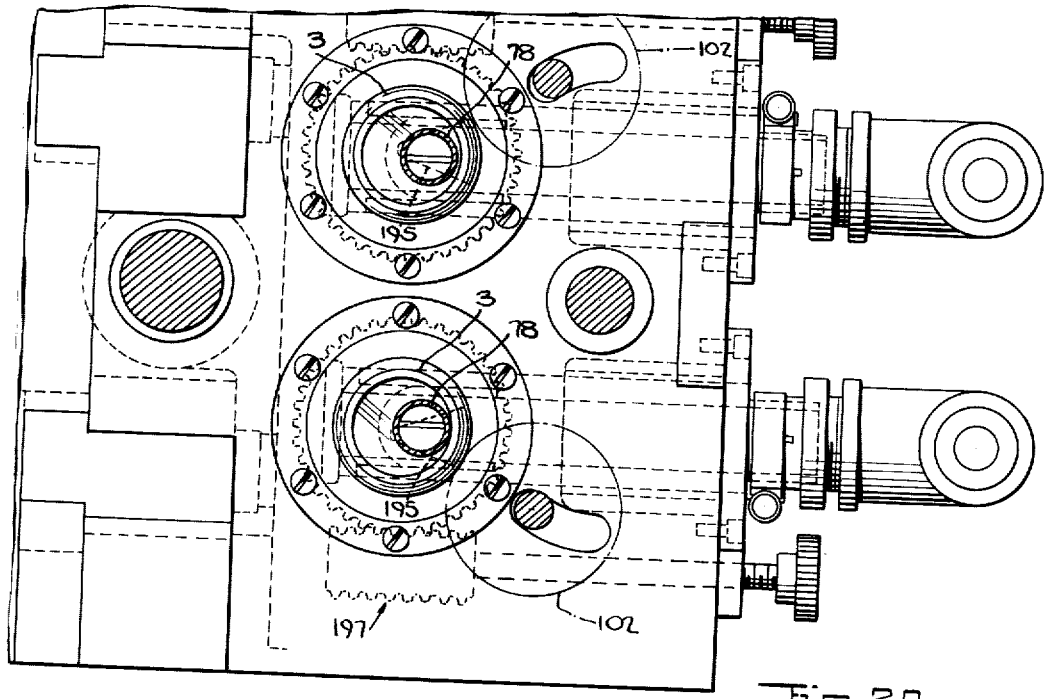
FIG. 20 is a plan view of the container bottom inspection station.
Figure 21:
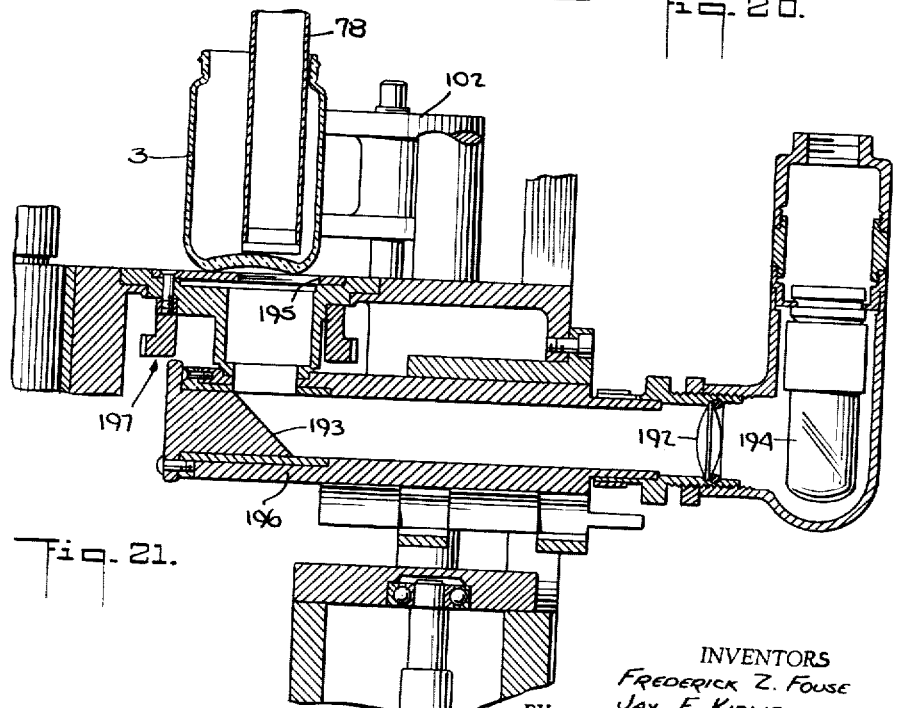
FIG. 21 is a sectional view of the bottom inspection station taken along line 21—21 of FIG. 20.

A brief description will first be given of the numerous types of objectionable flaws which may be present in containers or jars as they are received from the container forming machines. Some three dozen such flaws are illustrated in FIGURES 36–36M and will be described below.

The rim portion 2 of the glass containers 3 engages the closure cap gaskets to provide an air-tight or hermetic seal and this portion is known as the container finish. It is extremely important that this finish be smooth and without flaws so that it forms a seal with the cap gasket about its entire circumference. This is true whether the top or the corner or the side of the rim or any combination of these surfaces is being used for the particular jar being used.

There are three principal objectionable types of flaws, which occur in this finish portion of containers which prevent a good seal from being obtained. The first of these is a crack or check or split finish usually passing generally vertically down through the jar rim as illustrated at 4 (FIG. 36). It is necessary that the inspection machine 1 detect each container having such a check 4 in its rim and that it reject such a container whether the check extends to the finish surface or not as these checks 4 may cause a leaky seal or may also weaken the container so that it may break during handling.

A second and equally undesirable flaw which may be present at the container rim is an extremely minute depression in or across the top of the sealing surface. These are known as nits or marks and they are illustrated in exaggerated form at 5 in FIGURE 36 and FIGURE 18. It is important that these nits 5 be detected by the container inspection machine as they occur in the sealing finish area of the container and since even a nit which is extremely small or almost microscopic in size is large enough to allow sufficient air to enter the container to spoil the contents. Thus, it is desirable that the inspection machine detect nits which are so small that they would not normally be visible to the human eye during a visual container inspection.

A third flaw which is also objectionable in that it prevents an air-tight seal is a dip in the container rim somewhat larger than a nit 5, as illustrated in exaggerated form at 6 in FIGURES 19 and 36. It is also desirable that containers having such dips be rejected.

In addition to the above flaws there are several other flaws which occur in the rim or finish portion of the jars less frequently but which are objectionable when they do occur and which are detected by the nit and finish inspection stations of the machine. These include blisters which occur beneath the finish and within the glass as illustrated at 8 in FIG. 36G as well as soft blisters which may occur near the sealing finish surface so that a depression forms in the finish as illustrated at 8A in FIG. 36M. Occasionally a chip may be knocked-out of the rim as shown at 6A in FIG. 36 or the sealing surface may have a rough finish as illustrated at 6B. Occasionally from time to time the jar mold will not fill leaving the jar with an unfilled portion as illustrated at 6C in FIG. 36F or the jar finish may have a large wave or warp at its rim 2 as illustrated by FIG. 36L. Other defects occurring in the finish portion during molding may comprise a fault 6D in the knock-out ring as illustrated at 6D at FIG. 36F. A defective jar finish may also result from offset seams, as illustrated at 7A in FIG. 36K or an overpress of the jar rim as illustrated in 7B at FIG. 36J. Stones may also occur in rim portion of the jar such as the opaque stone illustrated at 7C in FIG. 36H or a projecting plunger mark 7D (FIG. 36K) may occur on the inside of the jar rim. The blisters, nits, dips and chips are detected at the nit detection station and the remaining defects as described above are detected at the finish inspection station as will be described below.

In addition to the above described flaws at the rim portions of containers there are several flaws which may be present in the body portion of the containers between the container rims and the container bottoms. The most objectionable flaw in this area of the container is a check or crack which may extend through the entire thickness of the container wall so that it weakens the container to the extent that the container may leak or even shatter during filling, sealing or subsequent handling. Such a check is illustrated in 7 at FIGURE 36.

Another flaw which occurs in the containers from time to time during their manufacturing is a bubble or blister 8 in the glass. A blister is objectionable since it leaves a relatively thin container sidewall which also weakens the container and makes it susceptible to breakage.

Also from time to time during container manufacture, minute impurities may become imbedded in the sidewalls of the container and these objects which are relatively opaque are known as stones. It is desirable that containers which are weakened or deformed by stones in their bodies as illustrated at 9 be detected and rejected by the inspection machine both to insure container strength and to reject containers with an appearance objectionable to consumers.

Another flaw which makes containers objectionable is a combustion mark which occurs during the manufacture of the containers and which comprises a rough or corrugated area of irregular shape as illustrated at 10 in FIGURE 36.

Additional flaws which render containers objectionable and which are occasionally found in containers are known as lap marks. These comprise ridges or beads which are known as vertical laps when they extend generally vertically on the container sidewalls as illustrated at 11 and which are known as horizontal laps when they extend circumferentially around the container as illustrated at 12.

Another flaw which it is desirable to detect as it affects both the appearance and strength is known as a washboard, as illustrated at 13 in FIGURE 36B. This flaw comprises a series of generally parallel ridges or grooves which resemble in effect the surface of a washboard.

Additional objectionable defects are small pieces of glass which are known as fused glass. These pieces of glass usually are found fused to the inner walls of containers and they are particularly objectionable as they may break loose and pass into the container contents. These faults as illustrated at 14 in FIGURE 36A are also detected by the inspection machine.

A scratch-like mark or tear may also occur in container manufacture. These tears as illustrated at 15 in FIGURE 36 are detected. Bad cordy glass and brush marks on the container bodies are detected at the body inspection stations.

Normal containers have two vertical marks or seam lines which occur where the two halves of the molds come together. Occasionally additional seam lines will be formed in container manufacture and these additional seams are known as blank seams. The inspection machine must pass the normal containers while preferably detecting and rejecting containers having additional seam lines 7D (FIG. 36) or other vertical marks. Thin walls also are objectionable and these are detected for rejection at the jar body inspection stations.

Similar flaws also occur in the container bottom and it is equally desirable that containers with these flaws in their bottoms be detected and rejected by the bottom inspection station of the container inspection machine. Thus, checked or fused bottoms or containers having stones or crizzle marks which are irregular lines or marks are detected for removal. Vertical spikes 8A (FIG. 36) also are detected as well as are deep baffle matches.

The container inspection machine selectively detects the presence of any of these flaws and thereupon removes the detected containers from the inspection machine before the container is presented at the next inspection station. In addition, the inspection system at each station is set so that only those flaws of the above described nature which are serious enough in their size or depth to be objectionable actuate the rejection mechanism. A continuous count is kept of each type of flaw detected which assists in the correction of container manufacture to eliminate the cause of the flaws.

*General Description*

The container inspection machine will now be described generally with particular reference to FIGURES 1-3. The inspection machine comprises a table 21 preferably mounted upon casters 22 so that the machine may be positioned as desired wherever the automatic inspection operation may be best performed. The containers to be inspected such as the glass jars 3 are fed continuously onto the left end 24 of the table top by conveyor belt 25.

A line of jars 3 are fed by the conveyor 25 to the inspection system which includes six separate inspection stations A–F positioned in line along the top of the table 21. Although the preferred embodiment as described and illustrated has six inspection stations, it is clear that more or less stations may be used for a particular machine. Each of these inspection stations inspects each of the jars 3 for a separate objectionable fault. Thus, the first inspection station A has an optical inspection system adapted to detect nits and dips or other faults on the rims of the jars 3 as described above. A stepped pocket wheel 31 moves the jars 3 successively to each of a pair of separate scanning positions 32 and 33 for this rim inspection. If no faults are detected at the rims of the jars 3, the jars 3 are passed from the pocket wheel 31 to a transfer conveyor 35 which moves the jars 3 to the next inspection station which is a bottom inspection station B. If, however, a fault is detected in the rim of a jar 3 at station A, a reject system closes a gate 40 which prevents the removal of the jars 3 by the conveyor 35 and causes the pocket wheel 31 to carry the jar 3 to a reject position 36. At the reject position 36 the reject belts 37, 38 and 39 carry the defective jar 3 from the pocket wheel 31 to a suitable reject chute (not shown).

At the bottom inspection station B, the pocket wheel 41 carries the jars 3 successively to each of two bottom scanning positions 42 and 43 where an optical inspection is made of the bottom of each of the jars 3. Detection of any of the above described faults in the jar bottom causes the defective jar 3 to be diverted by gate 40 to the reject conveyors 37–39 in the same manner as described above for rim inspection station A. If no fault is detected the jars 3 are transferred by transfer conveyor 44 to finish inspection station C.

The pocket wheel 45 of the finish inspection station C carries each of the jars 3 successively to finish scanning positions 46 and 47 where the jar finishes are scanned by an optical system which detects the above described checks, cracks or other faults. Defective jars are blocked from the transfer conveyor 48 by reject gate 40 and they pass to the reject conveyors 37–39. Jars 3 having no faults in their finish are transferred by transfer conveyor 48 to body station D which is the first of three body inspection stations at pocket wheels 55, 56 and 57.

The first body inspection station D includes a pair of body scanning positions 49 and 50 in pocket wheel 55 into which each jar 3 is moved consecutively and where the sidewall or body portion of each jar 3 is scanned for stones, blisters, washboards, laps, vertical marks and other faults as described above. In the first body inspection station D, the inspection is concentrated on the lower portion of the jar sidewall by causing the optical scanning system to move more slowly over this portion as will be more fully described in the detailed description.

In the second body inspection station E, a similar inspection is made of each jar 3 with the inspection being concentrated on the upper portion of each jar by moving the optical scanning means more slowly over this portion. This method of concentrating the scanning on a particular portion of the jar body by providing two inspection stations allows for a more sensitive scanning of the jars and a more efficient fault detection without requiring a reduction of the speed at which the jars are moved through the inspection machine. In each of these inspection stations a gate 40 is provided so that the detection of an objectionable fault at any of the inspection positions prevents forward passage of the defective jar on either conveyor 58 or 60 to the subsequent jar inspecting stations and so that defective jars are guided to the reject conveyors 37–39.

As will be discussed below more fully, the body inspection stations D and E have a scanning system in which the scanning light beam passes through the jar walls. This type of scanning system is most effective where the faults tend to bend or refract light beams. Certain faults such as stones and vertical marks tend to reflect a greater portion of the scanning light beam than is refracted. The body inspection station F reinspects each of the jar 3 sidewalls at two subsequent inspection positions. This inspection is done by directing a scanning light beam against the outer walls of the jars and by positioning a light receiving tube outside the wall in such a position that it receives reflected light from the stones and other defects which tend to reflect light and which have thus passed through the earlier inspection stations without being detected.

Jars 3 having no defects pass from the final body inspection station F on exit conveyor 60 and defective jars rejected at any of the six inspection stations are carried by the reject conveyors 37–39 to a suitable collection point.

*The Mechanical Drive and Synchronizing System*

In order to synchronize the movement of the rotating pocket wheels 31, 41, 45 and 55–57 at the inspection stations A–F with the movement of the optical system light tubes and with the operation of the container rejection gates 40, a unitary drive system is provided for these elements. This drive system is powered by a drive motor 61 (FIG. 5). The drive motor 61 is coupled by means of pulley 62, safety clutch pulley 63 and belt 64 to a Ferguson roller gear drive 65 through a reduction gear box 66. The Ferguson drive 65 provides intermittently rotated output motion on its output shaft 67 which is coupled to a horizontal drive shaft 68 running lengthwise of the inpection machine. Each of the pocket wheels for the inspection stations A–F are coupled to the drive shaft 68 by being mounted on vertical mounting shafts 70 which have their lower ends coupled to the drive shaft 68 by suitable beveled gears 71. In the embodiment of the machine illustrated, each of pocket wheels has six jar pockets and the Ferguson drive 65 and the beveled gears 71 are set so that each pocket wheel is intermittently turned through an angle of 60 degrees to carry successive jars 3 to the inspection positions.

In order to provide for a precise radial adjustment of each of the pocket wheels on its drive shaft, the pocket wheels are connected by a continuously adjustable wedge connection (FIG. 4) including the cylindrical wedge 73 which frictionally connects conical portion 74 of the drive shaft 70 and the pocket wheel hub 75. The body portion 76 of each pocket wheel is removably coupled to hub 75 by spring loaded detent balls 77 to prevent damage when a jam occurs. FIG. 4A illustrates a detent ball 77A coupling to the vertical portion of hub 75A.

As will be more fully described in connection with a description of the individual inspection stations A–F, each of the two scanning positions at each inspection station has a vertical light tube 78 which is lowered into the inspection position in the period between the stepped movement of the pocket wheels by a series of scanning cams 79–84 (FIG. 1). Each of the cams 79–84 is mounted on a horizontal cam shaft 85 which is continuously rotated in synchronism with the drive shaft 68 by being coupled to a horizontal cam shaft 86 through the intermediation of spiral gears 87. Cam shaft 86 is rotated in synchronism with the drive shaft 68 by being operatively coupled to the gear box 66.

The optical systems including jar scanning light tubes 78 for each of the inspection stations A–F are designated generally by reference numbers 88–93, and are reciprocated vertically by being connected to a vertical cam follower rod 94 which engages one of the cams 79–84 at a cam roller 95. The cams 79–84 are set to provide one complete vertical reciprocation movement for the optical system light tubes during the dwell period between each of the movements of the pocket wheels 31, 41, 45 and 55–57. Each of the optical systems except the system 89 at the bottom inspection station B has a vertical photocell tube 96 connected to the light tube 78 for movement therewith during the scanning operation. These tubes 78 and 96 are mounted on a bracket 97 (FIG. 27) at the top of the vertical cam follower rod 94. The operation of the optical systems for each of the inspection stations will be described below.

The conveyor belts 25 and 60 which carry the jars 3 into and out of the inspection machine as well as the reject conveyors 37–39 are driven from the end cam shaft 85 by a suitable coupling which includes pulleys 98 and belts 99 and 100. The short conveyors moving the jars between the inspection stations including belts 35, 44, 48, 58 and 59 are driven from belt 60 by suitable interconnecting drive belts.

At each of the two jar scanning positions for each of the six inspection stations A–F, the jars 3 are rotated at a relatively high speed while they are scanned by an optical scanning system. Each jar 3 is rotated in one direction at one scanning position and in the opposite direction at the other scanning position at each of the six inspection stations.

At the rim dip inspection station A where the scanning is performed at about 200 r.p.m., the jar drive wheels 102 are preferably run continuously as the jars are passed through the station. At the remaining stations the jars are rotated at faster rates and the passage of the jars is facilitated through these stations by having the drive wheels 102 and the jars 3 rotate only during the scanning period so that the jars 3 are not rotating when they pass into and out of the scanning positions.

A separate drive motor 101 is preferably provided for the inspection station A as illustrated in FIG. 1. Drive motor 101 is coupled to an individual jar drive wheel 102 at station A by the coupling means illustrated in FIGS. 6–8. At the scanning position the jar rotating wheels 102 engage the jars 3 and rotate them in cooperation with the jar support wheels 103 on the sides of the pockets in pocket wheel 31.

The preferred embodiment of the coupling between the drive motor 101 and the jar drive wheels 102 is illustrated in FIGS. 6, 7, 8 and 33–35. The drive wheel 102 at each inspection position is mounted on vertical drive shaft 104. The pair of drive shafts 104 are mounted in a drive box 105 as illustrated in FIG. 8. The drive box 105 has a main horizontal drive shaft 106 which is coupled to the drive motor 101 through the intermediation of pulleys 107 and 108 and coupling belt 109. The drive shaft 106 is coupled to the two vertical shafts 104 at each scanning position to rotate them in opposite directions so that the jars 3 rotate in opposite directions during the successive scanning operations. The coupling between the vertical shaft 104 and the horizontal drive shaft 106 includes a worm gear 110 which engages pinion gear 111 at the lower end of idler shaft 112. Idler shaft 112 is coupled to the vertical shaft 104 by pinion gears 113 and 114.

As illustrated in FIGS. 7 and 8, each of the drive shafts 104 is pivotally mounted on the idler shaft 112 by means of the spaced brackets 115. The interconnected and rotating gears 113 and 114 tend to turn the right-hand shaft 104 in a counterclockwise direction. It will be seen that this movement of the shafts 104 forces the drive wheels 102 against the jars 3 in the scanning positions and causes the rotating drive wheels 102 to spin the jars 3 in opposite directions. At the same time the pivotal mounting of the shaft 104 permits the drive wheels 102 to automatically adjust or accommodate themselves to the particular diameter of the jars 3 being scanned and provides a positive drive for the jars 3 having slightly differing sizes or non-circular cross-sections.

At the inspection stations B–F, the jars 3 are rotated at higher speeds than at station A during the scanning operations to facilitate selective detection of the particular faults for which these stations are provided. In the preferred embodiment, for example, the jars are rotated at about 375 r.p.m. at the bottom inspection station B, at about 750 r.p.m. at the finish inspection station C and at about 2200 r.p.m. at each of the body inspection stations D–F. In order to facilitate the entry and exit of the jars 3 from the scanning positions B–F, it is preferred that the rotation of the drive wheels 102 and the jars 3 be limited to the scanning period. The rotation of the jars is commenced at the beginning of the scanning operation and stopped at the end of the scanning operation.

The intermittent drive for stations B–F is illustrated in FIGS. 1, 3A, 3B and 3C. The drive includes a main drive shaft 300 having a hydraulic drive motor 301 at one end and having spaced drive pulleys 302 positioned along it. Each of the drive pulleys 302 is coupled to the drive pulley 108 of a drive box for each station as described above by a belt 303. Hydraulic fluid under pressure is periodically supplied to the drive motor 301 by valve 304 to cause it to rotate the shaft 300 and the interconnected jar rotating wheels 102 for the scanning period. The control valve 304 is operated by cam 305 on cam shaft 85 and has its inlet coupled to a suitable source of hydraulic pressure. The belts 303 are held under tension by idler pulley 306 on resilient pressure arm 307. The shaft 300 is preferably formed in sections with detachable couplers 308 to permit the belts 303 to be replaced without removing the entire shaft 300.

An alternate embodiment of an intermittent drive system for the jar rotation is illustrated in FIGS. 33–35. In this embodiment, a separate drive motor 101 is provided for each inspection station B–F.

As illustrated in FIG. 35, the continuously rotating shaft 116 of each drive motor 101 is coupled to a rotatable clutch plate 117 having a friction disc 118 mounted thereon. Drive pulley 108 is rotatably mounted on the shaft 116 on the bearings 119 by a rotatable collar 120. In normal operation the drive pulley 108 and its attached collar 120 are held against the rotating friction surface 118 of clutch plate 117 by a positioning arm 121 coupled to the collar 120 by bearing 122 and being attached at its other end 123 to a common braking rod 124 for all of the six drive pulleys 108. The braking rod 124 is connected by follower arm 125 (FIG. 33) to cam 126 which is operatively coupled and synchronized with cam shaft 85. Cam 126 moves the braking rod 124 to the left (FIG. 33) during the scanning period to engage the clutch plates 117 with the pulleys 108 to rotate the pulleys 108 with motor shaft 116 at the speed of the drive motors 101. To stop the rotation of the jars 3 to facilitate their transfer to and from inspection positions, cam 126 moves the braking rod 124 and connected drive pulley 108 to the right so that braking flange 127 on the collar 120 engages a stationary friction braking surface 134. This disconnects the drive motors 101 from the drive pulleys 108 and applies a braking action to each pulley to stop its rotation thereby stopping the drive wheels 102 and the rotation of the jars 3.

The braking action at each drive pulley 108 is individually controlled by the adjustable stop 128 on the positioning arm 121. Stop 128 adjustably determines the braking force transmitted to the slidably mounted arm 121 through the action of resilient member 129 which is compressed between the fixed stop 130 on the braking rod 104 and the adjustable stop 128. The best braking control adjustment for smooth rapid braking of jar rotation has been obtained with a resilient rubber member 129.

Similarly, the clutch engaging action at each drive pulley 108 is adjustably controlled to provide smooth and rapid acceleration and deceleration for the jar's rotation by adjustable stop 131. The movement of braking rod 124 is transferred to arm 121 through fixed stop 132 and a resilient member 133 which in the preferred embodiment is a helical spring which has been found preferable in providing the proper adjustment for a smooth clutch engaging action.

An alternate embodiment of the jar rotating drive means for use on the container finish and body scanning stations is illustrated in FIGS. 9–11. In this embodiment the drive wheel 102 is replaced by a turntable 140 rotatably mounted in suitable bearings 141 in a drive box 142. A friction coated upper surface 143 of the turntable 140 is positioned at the jar scanning positions to receive and rotate each of the jars 3. Each of the turntables 140 is coupled to one of the drive motors 101 through the intermediation of pulley 144, horizontal drive shaft 145 and intercoupled worm and pinion gears 146 and 147 respectively. The two turntables 140 at each scanning station are preferably rotated in opposite directions.

In order to retain each of the jars 3 on the rotating turntables 140, a vacuum hold-down system is provided which includes several small conduits 148 on the top of each turntable 140 which communicate with a source of vacuum through the hollow center 149 of the turntable 140 and inlet coupling 150.

*Jar Rim Nit and Dip Inspection Station "A"*

The first jar inspection station A is preferably a rim nit and dip inspection station which inspects the jar finish portion adjacent to the rim for objectionably low spots such as the above described rim nits or dips which prevent a satisfactory seal from being formed when the closure caps are applied to the jars.

This inspection station also detects the additional faults described above as these faults also affect the reflective pattern of the scanning beam in the same general manner as will now be described with particular relation to rim dips and nit marks. The following is a list of faults which are detected at this station.

(1) Nit marks
(2) Rim dips
(3) Soft blisters
(4) Unfilled finishes
(5) Warped finishes
(6) Chipped finishes A preferred embodiment of this inspection station is illustrated in FIGS. 15–19. This inspection station has two scanning positions so that each jar is inspected twice at two generally similar scanning positions which have their optical systems arranged, as will be more fully described below, to provide different incident angles for the inspecting light beams. Thus, nit or rim dips which may not be detected at the first position due to the particular shape of the flaw are detected at the second scanning position.

In order to provide for a smooth feeding of the jars 3 into the first pocket wheel 31 from the jar feeding conveyor 25, a gate 151 (FIGS. 3 and 14) is provided which intermittently slides open to admit one jar 3 to a pocket presented at the end of the conveyor 25 by the pocket wheel 31. The gate 151 is periodically moved to its open position in synchronism with the movement of the pocket wheel 31 by being operatively coupled to the drive shaft 62 through the intermediation of cam 152 follower rod 153 and connecting arms 154 and 155 (FIG. 3).

After a jar 3 has been moved into the scanning positions 32 and 33 by the pocket wheel 31, the optical system 88 lowers parallel light tube 78 and photocell tube 96 downwardly into scanning position through the intermediation of the vertically reciprocating cam follower rod 94 and cam 79. Light tube 78 has a light source on its upper end similar to that illustrated in FIG. 27 including the lamp 156, beam framing aperture 157 and a condensing system 158 which form a narrow scanning beam 159.

A scanning head 160 is fixedly attached to two telescopically mounted lower tube portions 78' and 96' and it has a pair of spaced support wheels 161 rotatably mounted on its bottom. The wheels 161 engage diametrically opposed portions of the rotating jar 3 being inspected to position the scanning head in a pre-determined scanning position with respect to the jar rim.

As illustrated in FIGURE 15, the downwardly projected light beam 159 from the light source is directed against the container rim along a path including a beam directing mirror 162.

In the preferred embodiment, the incident light beam is directed by the mirror 162 through channel 166 so that it strikes the upper surface of the container rim at about a 60 degree angle from the horizontal. A reflected light channel 163 is provided in the scanning head to receive light 164 reflected by nits or rim dips and to direct this reflected light by a mirror 165 to the photocell 168. In the preferred embodiment this reflected light channel forms an angle of 40 degrees with the horizontal, and the operation of the scanning light beam to detect nits and rim dips will now be explained with particular references to detailed FIGS. 18 and 19.

Referring to FIG. 18, a portion of the rim of a container 3 is illustrated with a typical nit mark 5 shown in greatly exaggerated form. It will be seen that the incident light beam 159 directed against the jar rim by the scanning head 160 at an angle of 60 degrees will normally be reflected at an equal angle so that the reflected beam will not pass through the reflector channel 163 in the scanning head 160. It has been found, however, that typical nits have a sloping surface at least part of which is inclined about 10 degrees from the horizontal so that the reflected beam 164 from this portion of a nit forms an angle of about 40 degrees with the horizontal so that it passes upwardly through channel 163 and is directed to the photocell 168 to activate the jar rejection system as will be described below.

The scanning head 160 at the second scanning position 33 is mounted on the opposite side of the jar as illustrated in FIG. 17 so that the relative angular positions of the incident and the reflected beams are reversed. Thus, it will be seen that a nit being the mirror image of the nit illustrated at 5 will be detected at the second scanning position 33 even if it passes through the first position 32 without being detected.

The functioning of the scanning head 160 with respect to a rim dip 6 is illustrated in FIG. 19. Rim dips which are deep enough to be objectionable in nearly all instances have one portion of their surface inclined at such an angle that the incident 60 degree beam 159 will be reflected by this portion of its surface into the 40 degree reflector channel 163. Here again, if the rim dip 6 is not detected at the first scanning station 32, the rim dip, if objectionably deep, will be detected at the second scanning station where the 60 degree beam falls on the rim dip in the opposite direction.

The light beam 164 reflected from a nit or dip activates the photoelectric tube 168 causing an output signal pulse which is fed to the amplifier 169 (FIG. 37) to operate container reject solenoid 170.

The operation of the container rejection system as controlled by the container reject relay solenoid 170 will now be described with particular reference to FIG. 12. A similar rejection system is used at each of the jar inspection stations A–F.

As illustrated in FIG. 12, each of the jars 3 is carried from the scanning positions 32 and 33 to an exit position 174 adjacent transfer conveyor belt 35. If no fault has been detected in the jar 3 at either of the scanning positions 32 and 33, a pivotally mounted gate member 40 will remain in its normal open position as illustrated in FIG. 12 so that the moving conveyor 35 carries the jars 3 from the pocket wheel 31 to the pocket wheel of the next inspection station.

If a nit or dip or other fault in the container rim has been detected by the above described optical scanning system at either of the two scanning positions 32 and 33, the gate 40 is swung across the conveyor 35 and the faulty jar 3 is carried beyond the transfer conveyor 35 and is passed to the reject conveyors 37–39 by the following jar reject system.

As illustrated in FIG. 12 the reject system includes a reject wheel 176 coupled to the pocket wheel drive shaft 70 so that it rotates in synchronization with the pocket wheel 31. Six vertically movable reject pins 177 are mounted around the circumference of the wheel 176 with one pin 177 corresponding to each of the pockets in the pocket wheel 31. The pins 177 remain in their normal raised position in the absence of a fault in a jar. When a fault is detected at either of the scanning positions 32 or 33, the arm 172 of the reject solenoid 170 coupled to that scanning position is moved downwardly by the amplifier 169 against the particular pin 177 corresponding to the pocket at that scanning position and lowers the pin 177 to its reject position as illustrated by pin 178. When the pocket containing the defective jar 3 and the corresponding lowered reject pin 178 reach the exit position 174 adjacent the transfer conveyors 35, passage of the jar 3 to the conveyor 35 is prevented by the gate 40 which is swung across the pocket opening and the conveyor 35. The gate 40 is swung across the conveyor 35 by the lowered reject pin 178 striking the crank 179 causing the gate 40 to swing counterclockwise through the intermediation of shaft 180, crank arm 181, and connecting rod 182. The next stepped movement of the pocket wheel 31 carries the defective jar 3 onto one or more of the reject conveyors 37–39 and these conveyors carry the defective jar 3 out of the pocket to a rejection chute. Pin raising cam 183 simultaneously returns the lowered reject pin 178 to its normal raised position for the next scanning cycle.

*Jar Bottom Inspection Station*

Jars having no defects causing their rejection by the jar nit and rim dip inspection station A are transferred by conveyor 35 to the bottom inspection station B. The pocket wheel 41 of the bottom inspection station B transports the jars 3 successively to the two bottom scanning positions 42 and 43. When the jars 3 have been moved into the scanning positions 42 and 43, the optical system 89 lowers a light tube 78 into each of the two jars 3. The bottom inspection station is illustrated in FIGS. 20–23 which show the light tubes 78 in their lowered position adjacent the bottom of a jar 3 which is being rotated by container drive wheel 102. The lower portion of each light tube 78 has a light aperture 186 having an inclined and mirrored surface 187 which reflects the vertical light beam 188 against the bottom of the jars at an angle to the jar bottoms as beam 189. When the beam 189 strikes a blister 190 in the jar bottom or other objectionable defects such as checks, stones, crizzle marks or fused glass, spikes or a deep baffle match a portion of the beam 189 is refracted downwardly along path 191 against a mirror 193. The mirror 193 directs the light beam from the blister 190 to a phototube 194 through a suitable focusing lens 192. The phototube 194 is connected to an amplifier 169 which operates a rejection system similar to that described above for the container rim nit and dip inspection station A.

When there are no objectionable defects in the jar bottom, the light beam 189 strikes the top plate 185 so that it fails to pass through the aperture 195 in bottom plate 185 and into the optical system for the phototube 194. The two light tubes 78 at the successive bottom scanning positions preferably face in opposite directions so that the scanning beams from the slots 186 in the bottom of tubes 78 pass through the jar bottoms along different lines. Checks or other faults which may be generally parallel to the first scanning beam and thus escape detection are picked up by the second beam. The plates 185 are rotatably mounted with their position being controlled by geared control knob systems 197 to permit the positioning of the apertures 195 for their optimum position for sensitive and selective detection.

The preferred scanning beam has a rectangular cross section 189 (FIG. 23A) positioned to be generally radially of the jar bottom and extending inwardly from the outer edge of the jar bottom to beyond the bottom center. This insures a complete scanning of the bottom of the rotating jar.

Jar Finish Inspection Station

The jar finish inspection station inspects the upper portion of the jars 3 including the outer rim 199 (FIG. 24) which engages a closure in the sealing of the jars. Occasionally in the manufacture and the handling of glass jars, cracks or checks occur at the rims or shoulders of the jars 3 and it is necessary to detect and reject jars having such cracks or checks. In addition, the scanning light beam is also diverted by additional defects as described above so that finish inspection station C effectively detects the following defects causing the rejection of the defective containers.

(1) Checks in finish or shoulder
(2) Overpressed jars
(3) Rim blisters
(4) Split finish
(5) Marks on sealing finish
(6) Knock-out finish
(7) Rough finish
(8) Offset ring seam
(9) Stones in rim
(10) Plunger marks on finish The jar finish inspection station C has two jar finish scanning positions 46 and 47 adapted to direct scanning light beams through the jar finish in different directions so that one beam or the other will detect a finish crack or other flaw no matter what angle it has with respect to the jar radius. Each of the jar finish scanning positions has a light tube 78 and a photocell tube 96. The light tube 78 is lowered by the above described optical system 90 so that a beam of light 203 is directed by mirror 205 as beam 204 through the entire jar finish from the rim of the jar downwardly through and including the jar shoulder. The horizontal beam 204 is redirected as beam 207 by a second generally vertical mirror 206 (FIG. 25) so that it strikes the jar finish at an acute angle with the jar radius. If the beam 207 strikes a crack or check 208 it will be reflected as a beam 209 against the inclined mirror 210 of the photocell tube 96 and the mirror 210 directs the reflected light beam vertically as beam 211 to a photocell 168. The photocell 168 is coupled to a reject system similar to that described above for the preceding inspection stations A and B which passes defective jars to reject conveyors 37–39. As shown in FIG. 25 the horizontal beams 207 are directed toward the jar 3 finish along oppositely directed paths so that they have different angles with respect to the jar radius whereby checks generally parallel to one of the beams 207 at one scanning station will be presented at an angle at the other scanning station to provide a reflected beam 209 to activate the rejection system.

Jar Body Inspection Stations D and E

Jars 3 which pass through the first three inspection stations A–C without being rejected for rim or bottom faults are next transferred by the transfer conveyor 48 to the body inspection station D. The pocket wheel 55 at this body inspection station D successively presents the jar 3 to two body scanning positions 49 and 50. At each of these positions the body portion of the jar is inspected by a scanning beam of light which passes through the walls of the rotating jars 3 preferably from a scanning light tube 78 positioned outside the jar 3 to a related photocell tube 96 positioned within the jars. The positions of the tubes 78 and 96 may be reversed with the light tube inside the jar as illustrated for station C, however, more effective scanning of the jar bodies has been found to result from the preferred positioning. The tubes 78 and 96 are lowered downwardly into the jars by a mechanical support similar to that described above for the position inspection stations A–C and controlled by the rotating cam 82. At both of the inspection positions 49 and 50, at station D, the scanning is concentrated on the lower half of the jar body by having the cam 82 shaped so that it lowers the tubes relatively rapidly down to the bottom of the jar and then raises them slowly upwardly past the lower portion of the jar. Thereafter, the tubes are raised more rapidly to their raised position. The second body inspection station E is similar in all respects to the station D now being described except that its scanning control cam 83 is shaped to raise the scanning tubes more slowly over the upper half of the jars 3 to concentrate the inspection on this portion of the jars 3.

By using two successive stations in this manner, a more thorough and accurate inspection is obtained of the jars without slowing down the speed at which the jars pass through the machine.

The inspection stations D and E are particularly adapted to detect the following faults:

(1) Checks
(2) Blisters
(3) Washboards
(4) Laps
(5) Combustion marks
(6) Fused glass
(7) Thin spots
(8) Crizzled sides
(9) Vertical marks
(10) Bad cordy glass
(11) Heavy brush marks The preferred arrangement of the optical system at these stations is illustrated in FIGS. 27–29. FIG. 28 illustrates the light tube 78 and the phototube 96 scanning the lower portion of a jar 3 at the one inspection position of station D. At this position the mirror 212 in the lower portion of the light tube 78 is preferably sloped at an angle of about 50 degrees with the horizontal so that the scanning beam 213 is tilted downward about 5 degrees as it passes through the aperture 214 in the light tube 78 and towards the photocell tube 96. When there is no defect in the jar wall, the scanning beam 213 normally strikes an opaque area on the light tube below the aperture 215. When any one of the above mentioned faults such as blister 216 is present in the jar wall, a significant portion of the scanning beam 213 is bent by the defect so that it passes through the aperture 215 and is reflected upwardly by mirror 217 to a photocell to initiate operation of the rejection system as described above.

A similar scanning system is used in one scanning position of the next body scanning station E. In the other scanning position at each of the body inspection stations D and E, a different optical scanning arrangement is used which is found to detect objectionable flaws which have not been detected by the optical system just described. This system is illustrated scanning the upper portion of jar 3 in FIG. 29. In this optical system the mirror 218 at the lower end of the light tube 78 has its surface at a 45 degree angle so that the scanning beam 219 is directed toward the jar wall on a horizontal path 220 rather than the slightly inclined path for the previously described scanning position. The horizontal scanning beam 220 normally would strike the opaque sidewall of phototube 96. However, the presence of a blister or flaw 221 bends a portion of the beam 220 upwardly so that it passes through the aperture 222 in the photocell tube 96 and is reflected upwardly by mirror 223 to energize a photocell to operate a jar reject system as described above.

Final Body Inspection Station F

Figure 30:
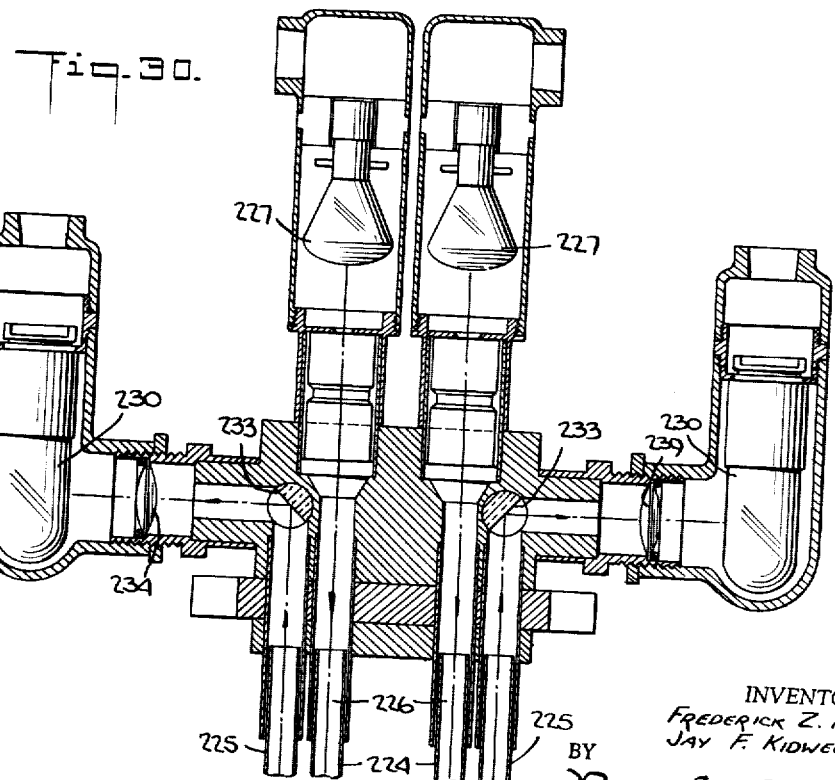
FIG. 30 is a fragmentary sectional view of the upper portion of the body inspection station for defects on the outer surface of the container sidewalls.

As described above, the body of each jar 3 is inspected once at each of the two body scanning positions of inspection stations D and E of the inspection machine. In each of these four scanning operations at these two stations, the light beam is passed through the container sidewalls to an optical system which is particularly adapted to detect the objectionable flaws listed above which bend, scatter or refract the incident light beam to a greater extent than they reflect it. The optical system at the final body inspection station F is adapted to detect objectionable flaws such as stones, vertical marks, laps, washboards, bad mold seams, combustion marks, blisters and tears which reflect a substantial portion of the incident light beam rather than refracting it. The arrangement of the light source and the photoelectric cell for each of these scanning positions of this last body inspection station F is illustrated in FIGS. 30 and 31.

Figure 31:
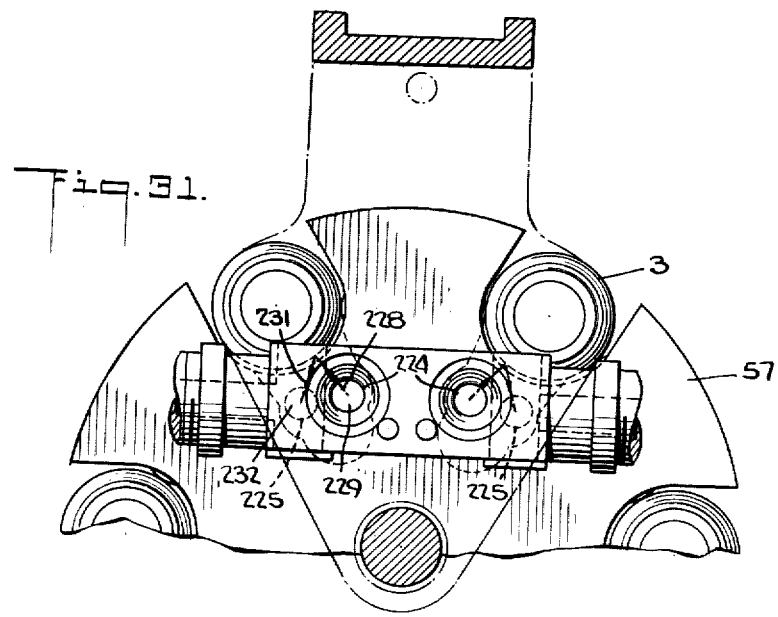
FIG. 31 is a detailed plan view of the inspection station of FIG. 30.

As illustrated in the plan view FIG. 31, both the light tubes 224 and the photocell tubes 225 are positioned outside of the jar 3. In the preferred embodiment, the light beam 226 from lamp 227 is directed against the jar 3 as scanning beam 228 by mirror 229 in a horizontal plane and in line with a jar radius. The tube 225 for the photocell 230 is positioned to receive a light beam 231 reflecting jar body faults and to transmit it to the photocell 230 by suitable mirrors 232 and 233 and lens 234. Preferably the beam receiving aperture in the tube 225 is adjusted to receive reflected light beams 231 which form an acute angle of about 60 degrees with the scanning beam 228 as this angle has been found to provide for the most effective fault detection. Other angles may be used depending on the scanning effectiveness desired. A scanning beam having a height of about one quarter of an inch and a width of about one sixteenth of an inch has proven to be effective in detecting stones and blisters as well as vertical marks and laps which have escaped detection at body stations D and E. The cam 84 (FIG. 1) which controls the lowering of the light tube and the photocell tube is sloped to provide for a constant upward scanning speed along the body portion of the jars 3.

Alternate Embodiment of the Rim Dip Inspector

An alternate embodiment of the rim dip inspection station is illustrated in FIG. 26. In this embodiment the light tube 78 is positioned so that it is moved downwardly into the jar mouth during the scanning operation and it has a mirror 235 and a cooperating aperture 236 which direct the scanning light beam 237 along a generally horizontal path 238 adjacent to the jar rim. A mask 239 is rotatably mounted on the bottom of the light tube 78 so that its lower surface 240 rests on the top of the rotating jar 3 and rotates therewith. When the rim of the jar 3 is level without dips or other flaws, the light beam is reflected and absorbed by the jar rim so that insufficient light passes on towards mirror 241 of the photocell tube 96 to activate the jar reject system.

When there is a dip or other flaw in the container rim, the light beam 238 passes between the lower surface 240 of the mask 239 and the container rim and through the aperture 242 in the photocell tube so that it is reflected upwardly by the mirror 241 to energize the reject system photoelectric cell to operate the container reject system as described above.

Rejection Control Amplifier

A preferred embodiment of the rejection control amplifier 169 is illustrated in FIG. 37. The output fault signal from each of the twelve photocells 168, 194 or 230 which preferably are of the photomultiplier type is coupled by coupling condenser 251 and adjustable gain control resistor 252 to the grid 253 of the triode amplifier section 254 of a dual triode tube 255 preferably of type 5692. The inverted and amplified signal from plate 256 of triode 254 is coupled to a clipper amplifier triode section 257 of tube 255 by the negatively and adjustably biased grid 258. The adjustable negative bias for clipper control grid 257 is used to adjust the grid 258 sufficiently below cut-off so that only the signal pulses from the fault in the jar are amplified and so that signal noise resulting from jar irregularities is eliminated. The gain control 252 in conjunction with the clipper grid bias control are used to determine whether the fault is severe enough to be rejected. This control is set low enough, for example, so that the signals received from normal jar seams do not trigger the multi-vibrator stage to reject the jars. The output of clipper amplifier 257 is coupled to a one-shot multi-vibrator stage using a dual triode 259. The triode section 260 of the tube 259 is normally held cut-off by the negative voltage applied to its grid 261 through the adjustable bias resistor 262. Triode section 263 of the multi-vibrator tube 259 is normally conducting and a fault signal from the clipper amplifier 257 cuts-off triode 263 causing the plate voltage of triode 263 to rise so that triode section 260 conducts. The plate voltage 260 now drops and is coupled through condenser 264 to the grid of triode section 263 holding it at cut-off. Triode 263 will remain cut-off for a period controlled by the time constant of condenser 264 and resistors 265 and 266. The plate 267 of triode section 263 is coupled to a negative voltage through voltage dividers 268 and 269. This negative voltage holds the grid 270 below cut-off.

When the multi-vibrator 259 is triggered by a jar fault the rise in the voltage on plate 267 of triode 263 causes tube 271 to conduct. This causes current to flow through the solenoid 272 of reject relay 273. Contacts 274 of relay 273 close to connect the coil 275 of reject solenoid 170 to a voltage source 276 causing the solenoid armature 277 to strike a reject pin 177. The time constant controls 264–266 and the multi-vibrator control 262 are set to keep the relay 273 energized until each jar is entirely scanned so that only one rejection action is provided and one count made for each jar. This also keeps the relay contacts 278 in the clipper amplifier cathode open during this period to de-activate the clipper amplifier as a further precaution against double counting due to additional faults in the same jar.

In the bottom and body inspection stations the downward passage of the scanning tubes past the jar finishes would give a large signal. To prevent such undesired signals, proximity switches 280 (FIG. 3) are positioned to be closed when the scanning tubes reach their scanning positions. The contact 281 (FIG. 37) of the proximity switch is placed in the clipper amplifier cathode to activate the amplifier only when the scanning tubes 78 and 96 or 224 and 225 reach their scanning positions.

In order to count the number of jars rejected at each station, a micro-switch 282 is mounted at each station (FIGS. 2 and 4) and it is held open by the gate 40 when the gate is in its normal position. When gate 40 swings to its container reject position, the switch 282 is released so that it closes operating a counter connected thereto to record the detection of a fault. The switches 282 are also connected to a total fault counter for each station so that a record of total faults detected at each station is made.

Operation

The operation of the inspection machine which has been referred to above in connection with detailed descriptions of the various portions of the machine will now be summarized.

The jars 3 are continuously fed into the machine 1 on the conveyor belt 25. A reciprocating gate 151 intermittently passes a jar 3 to an empty pocket in the stepped pocket wheel 31 of the jar nit and rim dip inspection station A. Intermittent rotation of the pocket wheel 31 carries each jar 3 successively to generally similar rim inspection positions 32 and 33. At the first inspection position 32 the jar 3 is rotated in one direction by the jar rotating wheel 102 while its rim is optically scanned to determine the presence of objectionable nits or dips or other faults. At the second inspection station 33 a second inspection is made of the same jar 3 by rotating it in the opposite direction and with the light scanning beam directed in an opposite direction to detect any rim nits or dips missed at the first inspection position 32.

The presence of a nit or dip in the jar rim permits the scanning light beam to pass over the rim and to activate a photocell 168. The signal generated in the photocell 168 is fed to amplifier 169 to activate the jar reject system illustrated in FIG. 12. The jar reject system for the rim dip inspection station 6 and each of the five subsequent inspection stations are similar. The reject solenoid 170 which is activated by the generation of a fault signal such as the rim dip signal or the other fault signals operates reject arm 172 to lower a reject pin 177 which corresponds to the pocket in the rotating pocket wheel containing the defective jar. The lowering of a reject pin 177 by the arm 172 closes a reject gate 40. The gate 40 prevents defective jars 3 from being transferred from the pocket wheel of the inspection stations to the jar transfer conveyors which normally carries the jars to the succeeding inspection stations and causes the defective jars 3 to be passed on to a reject position where they are transferred to reject conveyors 37–39.

Jars 3 which pass the rim dip inspection are transferred to conveyor 35 which carries them to an empty pocket in the stepped pocket wheel 41 of a jar bottom inspection station B. At this station each of the jars 3 is passed successively to bottom scanning positions 42 and 43. At these positions as shown in FIG. 22, a beam of light 189 is passed through the rotating bottoms of each of the jars 3. A fault 190 in the bottom of a jar 3 reflects the beam 179 as a re-directed beam 191 through a suitable optical system to a photocell 194. A fault signal is generated in photocell 194 which initiates a reject operation through a mechanism similar to that described above whereby the gate 40 at the bottom inspection station A is closed to prevent the forward transfer of the defective jars 3 to the rim inspection station C and thus causes the transfer of the defective jars 3 onto the reject conveyors 37–39.

Jars 3 which pass both the rim dip inspection and the bottom inspection are transferred onto conveyor belt 44 to a finish inspection station C where the jars 3 are rotated in opposite directions at successive rim inspection scanning positions 46 and 47. At these stations a scanning beam 204 is directed through the container finish as illustrated in FIGS. 24 and 25. The presence of a crack or other fault in the jar finish reflects the scanning beam 204 into suitably positioned photocells 168. These photocells react in the above described manner to close the reject gate 40 at the finish inspection station C so that the defective jars 3 are passed onto the reject belts 37–39.

Jars 3 which pass the finish inspection station are now passed on conveyor belt 48 to a body inspection system comprising three inspection stations D, E and F. At each of these stations the jars 3 are rotated in opposite directions at two scanning stations and the optical scanning systems are arranged at stations D and E to detect defects which refract a beam of light.

The optical system at the final body inspection station F is arranged to detect flaws which reflect a beam of light more effectively than they refract it so that the defects have escaped detection in stations D and E.

When a defective jar 3 is detected at any of the three body inspection stations the reject gate 40 is closed at this station to prevent the forward transfer of the defective jars 3 and to cause them to be passed to the reject belts 37–39. Thus, the detection of a fault in a jar 3 at any inspection station in the machine results in the removal of that jar from the inspection station and prevents the forwarding of a defective jar through subsequent inspection stations of the machine where such a jar is liable to shatter or chip and thereby interrupt and slow down the machine operation.

Jars 3 in which no fault is detected at any of the inspection stations are passed out on exit conveyors 60.

It will be seen that the present invention provides an improved fully automatic high speed container inspection machine adapted for the continuous automatic inspection of transparent containers such as glass jars. The machine is adapted to inspect all critical areas or surfaces of the containers including rims, top, corner and side finish surfaces, shoulders, body portions and bottoms. Inspection for objectionable faults in these various portions of the jars are made at a series of separate stations and jars in which a fault is detected are immediately removed from the inspection machine so that they are not passed through the remaining inspection stations. The optical systems at the various inspection stations may be individually adjusted. The provisions of these independent optical scanning positions also permits the machine to be adapted to a wide variety of inspections and also permits the inspections to be changed from time to time as is necessary to detect the particular type of objectionable fault which may render a particular transparent container useless or objectionable. The inspection machine of the present invention is reliable and compact and may be conveniently used directly in a jar inspection line.

As various changes may be made in the form, construction and arrangement of the parts herein without departing from the spirit and scope of the invention and without sacrificing any of its advantages, it is to be understood that all matters herein is to be interpreted as illustrative and not in a limiting sense.

Having thus described our invention, we claim:

1. An inspection machine for detecting defective transparent containers and for automatically rejecting the defective containers comprising three or more container inspection stations, means for moving the containers consecutively to said stations, inspecting means at each of said stations including a scanning light beam and a light sensitive means positioned to receive light from a flaw, said light beam being directed to pass inwardly of said containers at one of said stations, said light sensitive means being positioned outside of said container at said one station to receive light reflected by a flaw, said light beam being directed inwardly of said container at a second station, said light sensitive means being positioned within said container at said second station to receive light refracted by a flaw, and said light beam being directed outwardly through the container walls at said third station to receive light refracted by a flaw, and said light sensitive means being positioned outside said container at said third station.

2. An inspection machine for detecting defective transparent containers and for automatically rejecting the defective containers comprising a plurality of container inspection stations, means for moving the containers consecutively to said stations, inspecting means at each of said stations including a scanning light beam, said light beams being directed to pass through the body portion of the containers at said stations, means to move said scanning beam more slowly over one portion of said body of the container than the remaining portion at one station, and means to move the scanning beam more slowly over said remaining portions than said one portion at another station.

3. An automatic inspection machine for transparent containers comprising the combination of a plurality of inspection stations, a container scanning position at each of said stations, conveyor means to move containers between said stations, intermittent drive means to successively present containers to said scanning positions, container scanning and flaw sensing means at each inspection station, container rejection means coupled to said flaw sensing means adapted to reject a container from each of said wheels when a flaw is sensed therein, said flaw sensing means comprising a light transmission tube movably mounted for intermittent downward movement past the containers, first variable speed drive means operatively coupled to the tube at one station for moving said tube rapidly past one portion of the container body and relatively slowly past another portion, second variable speed drive means operatively coupled to the tube at a second station for moving the tube more rapidly past said other portion and more slowly past said one portion.

4. The machine as claimed in claim 3 in which said scanning position comprises a rotatable turntable, drive means to rotate said turntable, and means to form a vacuum at the top of said turntable to hold a rotating container thereon.

5. The machine as claimed in claim 3 in which said scanning position comprises a drive wheel rotatably mounted and positioned to frictionally engage and rotate a container at said scanning position, drive means for said drive wheel including a brake adapted to stop the rotation of said drive wheel and the container.

6. The machine as claimed in claim 5 which further comprises a pivotal mounting for said drive wheel adapted to provide swinging motion toward a container in said scanning position, and means to resiliently urge said drive wheel toward the container.

7. An inspection machine for transparent containers comprising the combination of means successively to support and to rotate a series of containers, a container scanning head having rim engaging members for engaging spaced portions on the rims of the rotating containers to position the head a predetermined distance thereabove, means periodically to raise and lower said head from the container rim, a light source, a first channel in said head to direct a beam of light through said head at a given angle to the plane of the container rim when said head is lowered, a second channel in said head at a different angle than said given angle from the plane of the container rim and positioned to direct a reflected light beam from defects in the container rim to a light sensitive means when said head is lowered.

8. The machine as claimed in claim 7 in which said first and second channels are disposed in a generally V shaped position, said first channel being positioned to direct said beam of light onto the container rim at an angle of about 60 degrees from the plane of the rim and said second channel being positioned to receive a reflected beam of light at about 40 degrees from the plane of the rim.

9. An inspection machine for transparent containers comprising the combination of means successively to support and to rotate a series of containers, a container scanning head having spaced rollers for engaging spaced portions on the rims of the rotating container, a pair of light transmitting tubes connected to said head for intermittently raising and lowering said head from the container rims, a light source on one tube, a photocell on the other tube, a first channel in said head to direct a beam of light through the head at a given angle to the plane of the container rim, a second channel in said head at a different angle from the plane of the container rim to direct a reflected light beam from a container rim defect to said photocell, and said photocell connected in circuit with container reject means.

10. The machine as claimed in claim 9 in which said first and second channels are disposed in a generally V shaped position and said first channel directs the light beam against the container rim at an acute angle to the plane of the rim and the second channel is positioned to receive reflected light at an acute angle differing by about 10 to 30 degrees from the first mentioned acute angle.

11. An automatic inspection machine for transparent articles comprising the combination of a plurality of article inspection stations aligned in spaced relationship, first article conveyor means connecting said inspection station to transfer articles successively from one to the other, to accept rejected articles from said inspection stations, container defect sensing means at each of said inspection stations including a scanning light beam and a light sensitive means adapted to detect defective articles, the scanning light beam at one station passing inwardly through the container walls and the defect sensing means being at least partially within the container, the scanning beam at another station passing outwardly through the container walls and the defect sensing means being outside of the container, a movably mounted member at each of said stations adapted for motion between a first position for directing containers to said first article conveyor means and a second position for directing containers to said reject means, and said defect sensing means at each of said station operatively coupled to said member to move it to said second position upon the sensing of a defective article.

12. The machine as claimed in claim 11 in which each of said inspection stations comprises rotatably mounted wheel having a plurality of container receiving pockets therein.

13. The machine as claimed in claim 12 in which each of said couplings between said member and said sensing means comprises a movable pin, a movable mounting for said pin operatively coupled to said wheel whereby said pin moves in synchronism with a container in said wheel and means to move said pin to a reject position when a defect is sensed by said defect sensing means.

14. An inspection machine for detecting defective transparent containers and for automatically rejecting the defective containers comprising a plurality of container inspection devices, means for moving the containers consecutively to said devices, inspection means at certain of said devices comprising a scanning light beam, said light beams being directed to pass through the body portion of the containers, means to move at least one of said scanning beams more slowly over one portion of the bodies of the containers than other portions.

15. An inspection machine for detecting defective transparent containers and for automatically rejecting the defective containers comprising a plurality of container inspection devices, means for moving the containers consecutively to said devices, inspection means at a plurality of said devices comprising a scanning light beam, said light beams being directed to pass through the body portion of the containers at said devices, means at one of said plurality of devices to move said scanning beams more slowly over a first portion of the bodies of the containers than a second portion, and means at another of said plurality of devices for moving said beam more slowly over said second portion than said first portion.

16. An inspection machine for detecting defective transparent containers and for automatically rejecting the defective containers comprising a plurality of container inspection devices, means for moving the containers consecutively to said devices, inspection means at certain of said devices comprising a scanning light beam, means at said certain devices to rotate the containers, said light beams being directed to pass along a generally horizontal path through the body portion of the containers at said devices, means to move at least one of said scanning beams more slowly over one portion of the bodies of the containers than other portions.

17. An inspection machine for detecting defective transparent containers and for automatically rejecting the defective containers comprising a plurality of container inspection devices, means for moving the containers consecutively to said devices, inspection means at certain of said devices comprising a scanning light beam directed onto the containers at said devices, means to direct the scanning beam at one of said certain devices onto the container rim at an acute angle with respect to the plane of the rim, and movably mounted support means for said beam directing means for supporting it on the rim of the rotating container.

18. An inspection machine for detecting defective transparent containers and for automatically rejecting the defective containers comprising a plurality of container inspection devices, means for moving the containers consecutively to said devices, inspection means at certain of said devices comprising a scanning light beam directed onto the containers at said devices, means to direct the scanning beam at one of said certain devices onto the container rim at an acute angle with respect to the plane of the rim, movably mounted support means for said beam directing means for supporting it on the rim of the rotating container, said beam directing means including a light receiving channel, and said support means being positioned whereby the scanning beam and the light receiving beam intersect at the container rim when the support means is in engagement therewith.

References Cited in the file of this patent

UNITED STATES PATENTS

| | | |
|---|---|---|
| 2,643,767 | Baker | June 30, 1952 |
| 2,791,696 | Schell | May 7, 1957 |
| 2,821,302 | Fowler | Jan. 28, 1958 |
| 2,902,151 | Miles | Sept. 1, 1959 |

UNITED STATES PATENT OFFICE
CERTIFICATE OF CORRECTION

Patent No. 3,098,564                          July 23, 1963

Frederick Z. Fouse et al.

It is hereby certified that error appears in the above numbered patent requiring correction and that the said Letters Patent should read as corrected below.

Column 18, line 61, strike out "to receive light refracted by a flaw,"; line 63, after "station" insert -- to receive light refracted by a flaw --; column 20, line 13, before "to accept" insert -- means --.

Signed and sealed this 28th day of April 1964.

(SEAL)
Attest:

ERNEST W. SWIDER                       EDWARD J. BRENNER

Attesting Officer                         Commissioner of Patents